United States Patent
Choi et al.

(10) Patent No.: US 10,623,047 B2
(45) Date of Patent: **\*Apr. 14, 2020**

(54) SYSTEMS AND METHODS FOR TUNABLE OUT-OF-BAND INTERFERENCE MITIGATION

(71) Applicant: Kumu Networks, Inc., Sunnyvale, CA (US)

(72) Inventors: Jung-il Choi, Sunnyvale, CA (US); Mayank Jain, Sunnyvale, CA (US); Wilhelm Steffen Hahn, Sunnyvale, CA (US); Alfred Riddle, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,679

(22) Filed: Jan. 15, 2019

(65) Prior Publication Data
US 2019/0181908 A1    Jun. 13, 2019

Related U.S. Application Data

(63) Continuation of application No. 15/937,237, filed on Mar. 27, 2018, now Pat. No. 10,236,922.
(Continued)

(51) Int. Cl.
*H04B 1/04* (2006.01)
*H04B 1/50* (2006.01)
(Continued)

(52) U.S. Cl.
CPC ............. *H04B 1/50* (2013.01); *H04B 1/0067* (2013.01); *H04B 1/1027* (2013.01); *H04B 1/525* (2013.01);
(Continued)

(58) Field of Classification Search
CPC ...... H04B 1/50; H04B 1/0067; H04B 1/1027; H04B 1/0057; H04B 2001/1045
(Continued)

(56) References Cited

U.S. PATENT DOCUMENTS 3,922,617 A   11/1975   Denniston et al.
4,321,624 A    3/1982   Gibson et al.
(Continued)

FOREIGN PATENT DOCUMENTS

EP        0755141 A3    10/1998
EP        1959625 BI     2/2009
(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.
(Continued)

*Primary Examiner* — Sonny Trinh
(74) *Attorney, Agent, or Firm* — Jeffrey Schox; Samuel Rosenthal

(57) ABSTRACT

A system for interference mitigation includes: a first transmit coupler; a receive-band noise cancellation system; a first transmit-band filter; a second transmit coupler; a first receive coupler; a transmit-band noise cancellation system; a first receive-band filter; and a second receive coupler.

20 Claims, 13 Drawing Sheets

Related U.S. Application Data

(60) Provisional application No. 62/477,341, filed on Mar. 27, 2017, provisional application No. 62/490,932, filed on Apr. 27, 2017, provisional application No. 62/571,595, filed on Oct. 12, 2017.

(51) Int. Cl.
*H04B 1/10* (2006.01)
*H04B 1/525* (2015.01)
*H04B 1/00* (2006.01)

(52) U.S. Cl.
CPC .... *H04B 1/0057* (2013.01); *H04B 2001/1045* (2013.01)

(58) Field of Classification Search
USPC ......................................................... 455/303
See application file for complete search history.

(56) References Cited

U.S. PATENT DOCUMENTS

| | | | |
|---|---|---|---|
| 4,952,193 | A | 8/1990 | Talwar |
| 5,212,827 | A | 5/1993 | Meszko et al. |
| 5,691,978 | A | 11/1997 | Kenworthy |
| 5,729,829 | A * | 3/1998 | Talwar ................... H04B 1/525 455/296 |
| 5,734,967 | A | 3/1998 | Kotzin et al. |
| 5,790,658 | A | 8/1998 | Yip et al. |
| 5,818,385 | A | 10/1998 | Bartholomew |
| 5,930,301 | A | 7/1999 | Chester et al. |
| 6,215,812 | B1 | 4/2001 | Young et al. |
| 6,240,150 | B1 | 5/2001 | Darveau et al. |
| 6,411,250 | B1 | 6/2002 | Oswald et al. |
| 6,539,204 | B1 | 3/2003 | Marsh et al. |
| 6,567,649 | B2 | 5/2003 | Souissi |
| 6,580,771 | B2 | 6/2003 | Kenney |
| 6,639,551 | B2 | 10/2003 | Li et al. |
| 6,657,950 | B1 | 12/2003 | Jones et al. |
| 6,686,879 | B2 | 2/2004 | Shattil |
| 6,725,017 | B2 | 4/2004 | Blount et al. |
| 6,907,093 | B2 | 6/2005 | Blount et al. |
| 6,915,112 | B1 | 7/2005 | Sutton et al. |
| 6,965,657 | B1 | 11/2005 | Rezvani et al. |
| 6,985,705 | B2 | 1/2006 | Shohara |
| 7,057,472 | B2 | 6/2006 | Fukamachi et al. |
| 7,110,381 | B1 | 9/2006 | Osullivan et al. |
| 7,139,543 | B2 | 11/2006 | Shah |
| 7,177,341 | B2 | 2/2007 | McCorkle |
| 7,228,104 | B2 | 6/2007 | Collins et al. |
| 7,266,358 | B2 | 9/2007 | Hillstrom |
| 7,302,024 | B2 | 11/2007 | Arambepola |
| 7,336,128 | B2 | 2/2008 | Suzuki et al. |
| 7,336,940 | B2 | 2/2008 | Smithson |
| 7,348,844 | B2 | 3/2008 | Jaenecke |
| 7,349,505 | B2 | 3/2008 | Blount et al. |
| 7,362,257 | B2 | 4/2008 | Bruzzone et al. |
| 7,372,420 | B1 | 5/2008 | Osterhues et al. |
| 7,397,843 | B2 | 7/2008 | Grant et al. |
| 7,426,242 | B2 | 9/2008 | Thesling |
| 7,508,898 | B2 | 3/2009 | Cyr et al. |
| 7,509,100 | B2 | 3/2009 | Toncich |
| 7,706,755 | B2 | 4/2010 | Muhammad et al. |
| 7,733,813 | B2 | 6/2010 | Shin et al. |
| 7,773,759 | B2 | 8/2010 | Alves et al. |
| 7,773,950 | B2 | 8/2010 | Wang et al. |
| 7,778,611 | B2 | 8/2010 | Asai et al. |
| 7,869,527 | B2 | 1/2011 | Vetter et al. |
| 7,948,878 | B2 | 5/2011 | Briscoe et al. |
| 7,962,170 | B2 | 6/2011 | Axness et al. |
| 7,987,363 | B2 | 7/2011 | Chauncey et al. |
| 7,999,715 | B2 | 8/2011 | Yamaki et al. |
| 8,005,235 | B2 | 8/2011 | Rebandt et al. |
| 8,023,438 | B2 | 9/2011 | Kangasmaa et al. |
| 8,027,642 | B2 | 9/2011 | Proctor et al. |
| 8,031,744 | B2 | 10/2011 | Radunovic et al. |
| 8,032,183 | B2 | 10/2011 | Rudrapatna |
| 8,036,606 | B2 | 10/2011 | Kenington |
| 8,055,235 | B1 * | 11/2011 | Gupta ..................... H04B 1/10 455/296 |
| 8,060,803 | B2 | 11/2011 | Kim |
| 8,081,695 | B2 | 12/2011 | Chrabieh et al. |
| 8,085,831 | B2 | 12/2011 | Teague |
| 8,086,191 | B2 | 12/2011 | Fukuda et al. |
| 8,090,320 | B2 | 1/2012 | Dent et al. |
| 8,155,046 | B2 | 4/2012 | Jung et al. |
| 8,155,595 | B2 | 4/2012 | Sahin et al. |
| 8,160,176 | B2 | 4/2012 | Dent et al. |
| 8,175,535 | B2 | 5/2012 | Mu |
| 8,179,990 | B2 | 5/2012 | Orlik et al. |
| 8,218,697 | B2 | 7/2012 | Guess et al. |
| 8,270,456 | B2 | 9/2012 | Leach et al. |
| 8,274,342 | B2 | 9/2012 | Tsutsumi et al. |
| 8,306,480 | B2 | 11/2012 | Muhammad et al. |
| 8,331,477 | B2 | 12/2012 | Huang et al. |
| 8,349,933 | B2 | 1/2013 | Bhandari et al. |
| 8,351,533 | B2 | 1/2013 | Shrivastava et al. |
| 8,385,855 | B2 | 2/2013 | Lorg et al. |
| 8,385,871 | B2 | 2/2013 | Wyville |
| 8,391,878 | B2 | 3/2013 | Tenny |
| 8,417,750 | B2 | 4/2013 | Yan et al. |
| 8,422,412 | B2 | 4/2013 | Hahn |
| 8,422,540 | B1 | 4/2013 | Negus et al. |
| 8,428,542 | B2 | 4/2013 | Bornazyan |
| 8,446,892 | B2 | 5/2013 | Ji et al. |
| 8,457,549 | B2 | 6/2013 | Weng et al. |
| 8,462,697 | B2 | 6/2013 | Park et al. |
| 8,467,757 | B2 | 6/2013 | Ahn |
| 8,472,573 | B2 * | 6/2013 | Solum ................... H03G 3/3052 375/345 |
| 8,498,585 | B2 | 7/2013 | Vandenameele |
| 8,502,924 | B2 | 8/2013 | Liou et al. |
| 8,509,129 | B2 | 8/2013 | Deb et al. |
| 8,521,090 | B2 | 8/2013 | Kim et al. |
| 8,576,752 | B2 | 11/2013 | Sarca |
| 8,611,401 | B2 | 12/2013 | Lakkis |
| 8,619,916 | B2 | 12/2013 | Jong |
| 8,625,686 | B2 | 1/2014 | Li et al. |
| 8,626,090 | B2 | 1/2014 | Dalipi |
| 8,649,417 | B2 | 2/2014 | Baldemair et al. |
| 8,711,943 | B2 | 4/2014 | Rossato et al. |
| 8,743,674 | B2 | 6/2014 | Parnaby et al. |
| 8,744,377 | B2 | 6/2014 | Rimini et al. |
| 8,750,786 | B2 | 6/2014 | Larsson et al. |
| 8,755,756 | B1 | 6/2014 | Zhang et al. |
| 8,767,869 | B2 | 7/2014 | Rimini et al. |
| 8,787,907 | B2 | 7/2014 | Jain et al. |
| 8,798,177 | B2 | 8/2014 | Park et al. |
| 8,804,975 | B2 | 8/2014 | Harris et al. |
| 8,837,332 | B2 | 9/2014 | Khojastepour et al. |
| 8,842,584 | B2 | 9/2014 | Jana et al. |
| 8,879,433 | B2 | 11/2014 | Khojastepour et al. |
| 8,879,811 | B2 | 11/2014 | Liu et al. |
| 8,913,528 | B2 | 12/2014 | Cheng et al. |
| 8,923,877 | B2 * | 12/2014 | Youtz ................... H04W 72/082 455/452.2 |
| 8,929,550 | B2 | 1/2015 | Shattil et al. |
| 8,937,874 | B2 | 1/2015 | Gainey et al. |
| 8,942,314 | B2 | 1/2015 | Aparin |
| 8,995,410 | B2 | 3/2015 | Balan et al. |
| 8,995,932 | B2 | 3/2015 | Wyville |
| 9,014,069 | B2 | 4/2015 | Patil et al. |
| 9,019,849 | B2 | 4/2015 | Hui et al. |
| 9,031,567 | B2 | 5/2015 | Haub |
| 9,042,838 | B2 | 5/2015 | Braithwaite |
| 9,054,795 | B2 | 6/2015 | Choi et al. |
| 9,065,519 | B2 | 6/2015 | Cyzs et al. |
| 9,077,421 | B1 | 7/2015 | Mehlman et al. |
| 9,112,476 | B2 | 8/2015 | Basaran et al. |
| 9,124,475 | B2 | 9/2015 | Li et al. |
| 9,130,747 | B2 | 9/2015 | Zinser et al. |
| 9,136,883 | B1 | 9/2015 | Moher et al. |
| 9,160,430 | B2 | 10/2015 | Maltsev et al. |
| 9,184,902 | B2 | 11/2015 | Khojastepour et al. |
| 9,185,711 | B2 | 11/2015 | Lin et al. |

(56) References Cited

U.S. PATENT DOCUMENTS

| | | |
|---|---|---|
| 9,231,647 B2 | 1/2016 | Polydoros et al. |
| 9,231,712 B2 | 1/2016 | Hahn et al. |
| 9,236,996 B2 | 1/2016 | Khandani |
| 9,264,024 B2 | 2/2016 | Shin et al. |
| 9,312,895 B1 | 4/2016 | Gupta et al. |
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |
| 9,425,838 B1 * | 8/2016 | Gupta ............... H04B 1/10 |
| 9,455,756 B2 | 9/2016 | Choi et al. |
| 9,461,698 B2 | 10/2016 | Moffatt et al. |
| 9,479,198 B2 | 10/2016 | Moher et al. |
| 9,490,918 B2 | 11/2016 | Negus et al. |
| 9,490,963 B2 | 11/2016 | Choi et al. |
| 9,537,543 B2 | 1/2017 | Choi |
| 9,559,734 B2 | 1/2017 | Hwang et al. |
| 9,621,221 B2 | 4/2017 | Hua et al. |
| 9,742,593 B2 | 8/2017 | Moorti et al. |
| 9,800,275 B2 * | 10/2017 | Choi ............... H04B 1/1036 |
| 10,230,410 B2 * | 3/2019 | Choi ............... H04B 1/1036 |
| 10,236,922 B2 * | 3/2019 | Choi ............... H04B 1/1027 |
| 10,404,297 B2 * | 9/2019 | Choi ............... H04B 1/10 |
| 2002/0034191 A1 | 3/2002 | Shattil |
| 2002/0064245 A1 | 5/2002 | McCorkle |
| 2002/0072344 A1 | 6/2002 | Souissi |
| 2002/0109631 A1 | 8/2002 | Li et al. |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0030888 A1 | 2/2005 | Thesling |
| 2005/0078743 A1 | 4/2005 | Shohara |
| 2005/0101267 A1 | 5/2005 | Smithson |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2006/0240769 A1 | 10/2006 | Proctor et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0207748 A1 | 9/2007 | Toncich |
| 2007/0249314 A1 | 10/2007 | Sanders et al. |
| 2007/0274372 A1 | 11/2007 | Asai et al. |
| 2007/0283220 A1 | 12/2007 | Kim |
| 2007/0296625 A1 | 12/2007 | Bruzzone et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0279122 A1 | 11/2008 | Fukuda et al. |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0213770 A1 | 8/2009 | Mu |
| 2009/0221231 A1 | 9/2009 | Murch et al. |
| 2009/0262852 A1 | 10/2009 | Orlik et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Ahn et al. |
| 2010/0117693 A1 | 5/2010 | Buer et al. |
| 2010/0136900 A1 | 6/2010 | Seki |
| 2010/0150032 A1 | 6/2010 | Zinser et al. |
| 2010/0150033 A1 | 6/2010 | Zinser et al. |
| 2010/0150070 A1 | 6/2010 | Chae et al. |
| 2010/0159858 A1 | 6/2010 | Dent et al. |
| 2010/0197231 A1 | 8/2010 | Kenington |
| 2010/0208854 A1 | 8/2010 | Guess et al. |
| 2010/0215124 A1 | 8/2010 | Zeong et al. |
| 2010/0226356 A1 | 9/2010 | Sahin et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0266057 A1 | 10/2010 | Shrivastava et al. |
| 2010/0277289 A1 | 11/2010 | Brauner et al. |
| 2010/0278085 A1 | 11/2010 | Hahn |
| 2010/0279602 A1 | 11/2010 | Larsson et al. |
| 2010/0284447 A1 | 11/2010 | Gore et al. |
| 2010/0295716 A1 | 11/2010 | Yamaki et al. |
| 2011/0013684 A1 | 1/2011 | Semenov et al. |
| 2011/0013735 A1 | 1/2011 | Huang et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0227664 A1 | 9/2011 | Wyville |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0052892 A1 | 3/2012 | Braithwaite |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0140860 A1 | 6/2012 | Rimini et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0164965 A1 * | 6/2012 | Solum ............... H03G 3/3052 455/226.2 |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0077502 A1 | 3/2013 | Gainey et al. |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0120190 A1 | 5/2013 | McCune |
| 2013/0142030 A1 | 6/2013 | Parnaby et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0286903 A1 | 10/2013 | Khojastepour et al. |
| 2013/0294523 A1 | 11/2013 | Rossato et al. |
| 2013/0301487 A1 | 11/2013 | Khandani |
| 2013/0301488 A1 | 11/2013 | Hong et al. |

(56) References Cited

U.S. PATENT DOCUMENTS

| | | |
|---|---|---|
| 2013/0308717 A1 | 11/2013 | Maltsev et al. |
| 2013/0315211 A1 | 11/2013 | Balan et al. |
| 2014/0011461 A1 | 1/2014 | Bakalski et al. |
| 2014/0016515 A1 | 1/2014 | Jana et al. |
| 2014/0036736 A1 | 2/2014 | Wyville |
| 2014/0072072 A1 | 3/2014 | Ismail et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0194073 A1 | 7/2014 | Wyville et al. |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0269991 A1 | 9/2014 | Aparin |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0349595 A1 | 11/2014 | Cox |
| 2014/0376416 A1 | 12/2014 | Choi |
| 2015/0043685 A1 | 2/2015 | Choi et al. |
| 2015/0049834 A1 | 2/2015 | Choi et al. |
| 2015/0094008 A1 | 4/2015 | Maxim et al. |
| 2015/0103745 A1 | 4/2015 | Negus et al. |
| 2015/0139122 A1 | 5/2015 | Rimini et al. |
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0180522 A1 | 6/2015 | Wyville |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0270865 A1 | 9/2015 | Polydoros et al. |
| 2015/0303984 A1 | 10/2015 | Braithwaite |
| 2016/0043759 A1 | 2/2016 | Choi et al. |
| 2016/0056846 A1 | 2/2016 | Moher et al. |
| 2016/0105213 A1 | 4/2016 | Hua et al. |
| 2016/0119019 A1 | 4/2016 | Pratt |
| 2016/0119020 A1 | 4/2016 | Charlon |
| 2016/0182097 A1 | 6/2016 | Jiang et al. |
| 2016/0218769 A1 | 7/2016 | Chang et al. |
| 2016/0266245 A1 | 9/2016 | Bharadia et al. |
| 2016/0269061 A1 | 9/2016 | Hwang et al. |
| 2016/0285486 A1 | 9/2016 | Qin et al. |
| 2016/0294425 A1 | 10/2016 | Hwang et al. |
| 2016/0344432 A1 | 11/2016 | Hwang et al. |
| 2016/0380706 A1 | 12/2016 | Tanzi et al. |
| 2017/0041095 A1 | 2/2017 | Hwang et al. |
| 2017/0187513 A9 | 6/2017 | Bharadia et al. |

FOREIGN PATENT DOCUMENTS

| | | |
|---|---|---|
| EP | 2237434 A1 | 10/2010 |
| EP | 2267946 A2 | 12/2010 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

International Search Report and Written Opinion for International Application No. PCT/US18/24577.

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

\* cited by examiner

PRIOR ART

SYSTEMS AND METHODS FOR TUNABLE OUT-OF-BAND INTERFERENCE MITIGATION

CROSS-REFERENCE TO RELATED APPLICATIONS

This application is a continuation of U.S. patent application Ser. No. 15/937,237, filed 27 Mar. 2018, which claims the benefit of U.S. Provisional Application Ser. No. 62/477,341, filed on 27 Mar. 2017, of U.S. Provisional Application Ser. No. 62/490,932, filed on 27 Apr. 2017, and of U.S. Provisional Application Ser. No. 62/571,595, filed on 12 Oct. 2017, all of which are incorporated in their entireties by this reference.

TECHNICAL FIELD

This invention relates generally to the wireless communications field, and more specifically to new and useful systems and methods for tunable out-of-band interference mitigation.

BACKGROUND

Traditional wireless communication systems are half-duplex; that is, they are not capable of transmitting and receiving signals simultaneously on a single wireless communications channel. One way that this issue is addressed is through the use of frequency division multiplexing (FDM), in which transmission and reception occur on different frequency channels. Unfortunately, the performance of FDM-based communication is limited by the issue of adjacent-channel interference (ACI), which occurs when a transmission on a first frequency channel contains non-negligible strength in another frequency channel used by a receiver. ACI may be addressed by increasing channel separation, but this in turn limits the bandwidth available for use in a given area. ACI may also be addressed by filtering, but to achieve high isolation, high-quality fixed frequency filters are typically used. For applications in which multiple operation frequencies are desired, traditional implementations require multiple such fixed filters, in turn increasing system cost and size. Thus, there is a need in the wireless communications field to create new and useful systems and methods for tunable out-of-band interference mitigation. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. System for Tunable Out-of-band Interference Mitigation

A system 1000 for tunable out-of-band interference mitigation includes at least one of a transmit band interference cancellation system (TxICS) 1100, a transmit band noise cancellation system (TxNCS) 1200, a receive band interference cancellation system (RxICS) 1300, and a receive band noise cancellation system (RxNCS) 1400. The system 1000 may additionally include any number of additional elements to enable interference cancellation and/or filtering, including signal couplers 1010, amplifiers 1020, frequency upconverters 1030, frequency downconverters 1040, analog-to-digital converters (ADC) 1050, digital-to-analog converters (DAC) 1060, time delays 1070, filters 1080, and any other circuit components (e.g., phase shifters, attenuators, transformers, etc.).

The system 1000 is preferably implemented using digital and/or analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 1000 preferably includes memory to store configuration data, but may additionally or alternatively be configured using externally stored configuration data or in any suitable manner.

The system 1000 functions to reduce interference present in a communications receiver resulting from transmission of a nearby transmitter on an adjacent communications channel (e.g., adjacent-channel interference). Adjacent-channel interference may result from either or both of a receiver receiving transmissions outside of a desired receive channel and a transmitter transmitting (either intentionally or via leakage) on the desired receive channel.

Figure 1:
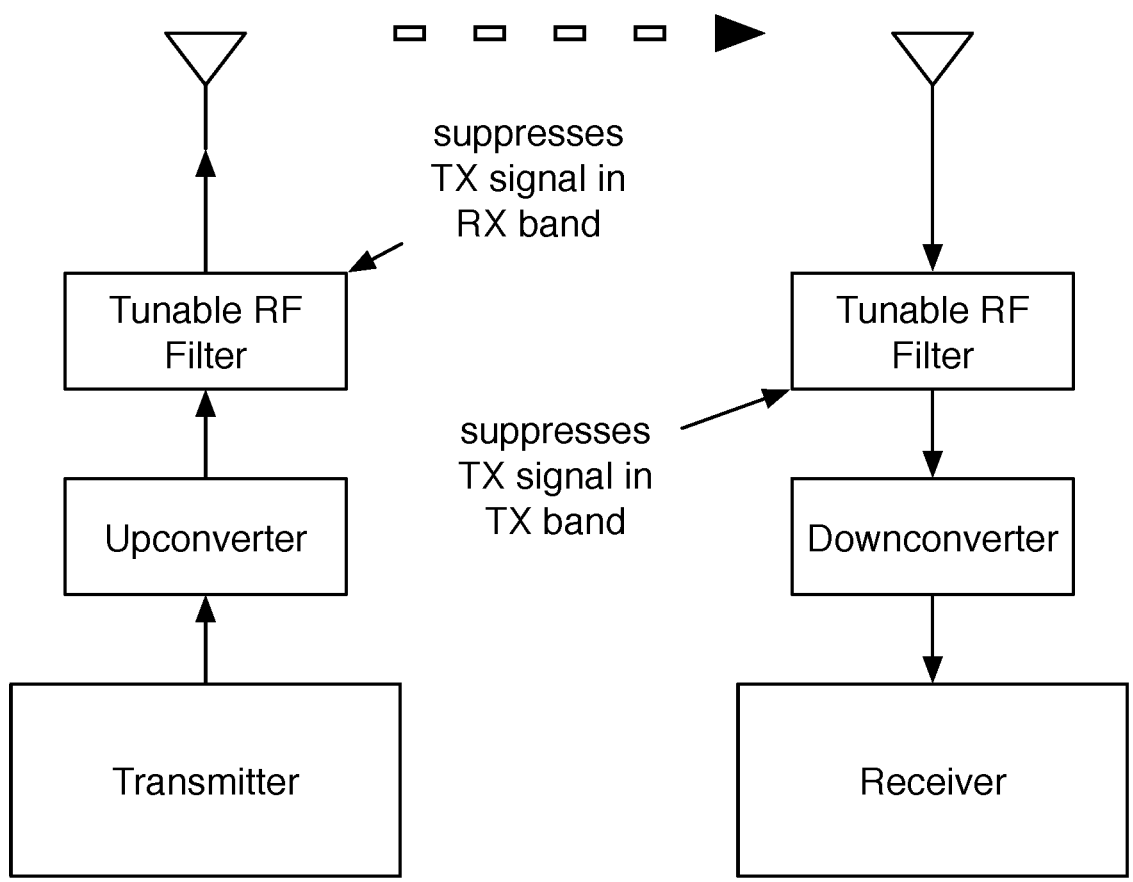
FIG. 1 is prior art representation of out-of-band interference mitigation.

Traditionally, adjacent-channel interference has been mitigated using tunable or selectable filter-based architectures; for example, as shown in FIG. 1. On the transmit side, the tunable radio frequency (RF) filter is used to suppress the transmit signal in the receive band (e.g., a bandpass filter that only lets the transmit band pass). On the receive side, the tunable RF filter is generally used to suppress interference due to the transmitted signal in the transmit band (e.g., a bandpass filter that only lets the receive band pass). In some cases, this filter may also be used to selectively filter signal in the receive band as well.

This purely filter-based approach is limited primarily by its ability to remove interference in the receive band. Filtering in the receive band primarily occurs at the transmit side. Since, frequently, out-of-channel signal results from non-linear processes such as amplification, this filtering must generally occur at RF and after power amplification, which means that the transmit filter must both be able to reject a large amount of signal out-of-band without a large insertion loss. In other words, in these cases the filter must generally have a high quality factor (Q factor, Q), high insertion loss, or low interference rejection ability.

Likewise, the RF filter on the receive side must also be able to reject a large amount of signal out-of-band (since the transmit side filter does not filter the transmit band signal), and so it must also have high Q, high insertion loss, or low interference rejection ability. Note that these limitations are especially apparent in cases where the transmit and receive antennas are nearby (i.e., antenna isolation is low), because the amount of power that must be rejected by the RF filters increases; or when channel separation is small (and therefore filter Q must be higher).

Some systems, such as the out-of-band interference mitigation system of U.S. patent application Ser. No. 15/378,180, have improved interference mitigation by performing interference cancellation either as a substitute for or in addition to interference filtering. Such systems may use a receive band interference cancellation system to remove interference in the receive band, as well as either or both of the transmit band interference cancellation system and transmit band interference filtering system to remove interference in the transmit band.

While interference cancellation has numerous advantages, it also has some disadvantages; most notably, for MIMO systems, interference cancellation complexity scales with N×N (in other words, a 3×3 MIMO system may require 9 cancellation modules).

The system 1000 preferably includes noise cancellation systems (e.g., TxNCS 1200/RxNCS 1400) that may provide substantial improvement over traditional filtering architectures without incurring all costs of interference cancellation (e.g., MIMO scalability issues). Note, though, that some implementations of the system 1000 utilize interference cancellation in addition to or in the alternative to noise cancellation (these implementations may make use of advanced filtering techniques to provide improvement over previous interference cancellation architectures).

The system 1000 may be arranged in various architectures including these elements, enabling flexibility for a number of applications. In some embodiments, the system 1000 may be attached or coupled to existing transceivers; additionally or alternatively, the system 1000 may be integrated into transceivers. Examples of architectures of the system 1000 are as shown in FIGS. 2-8B.

Figure 2:
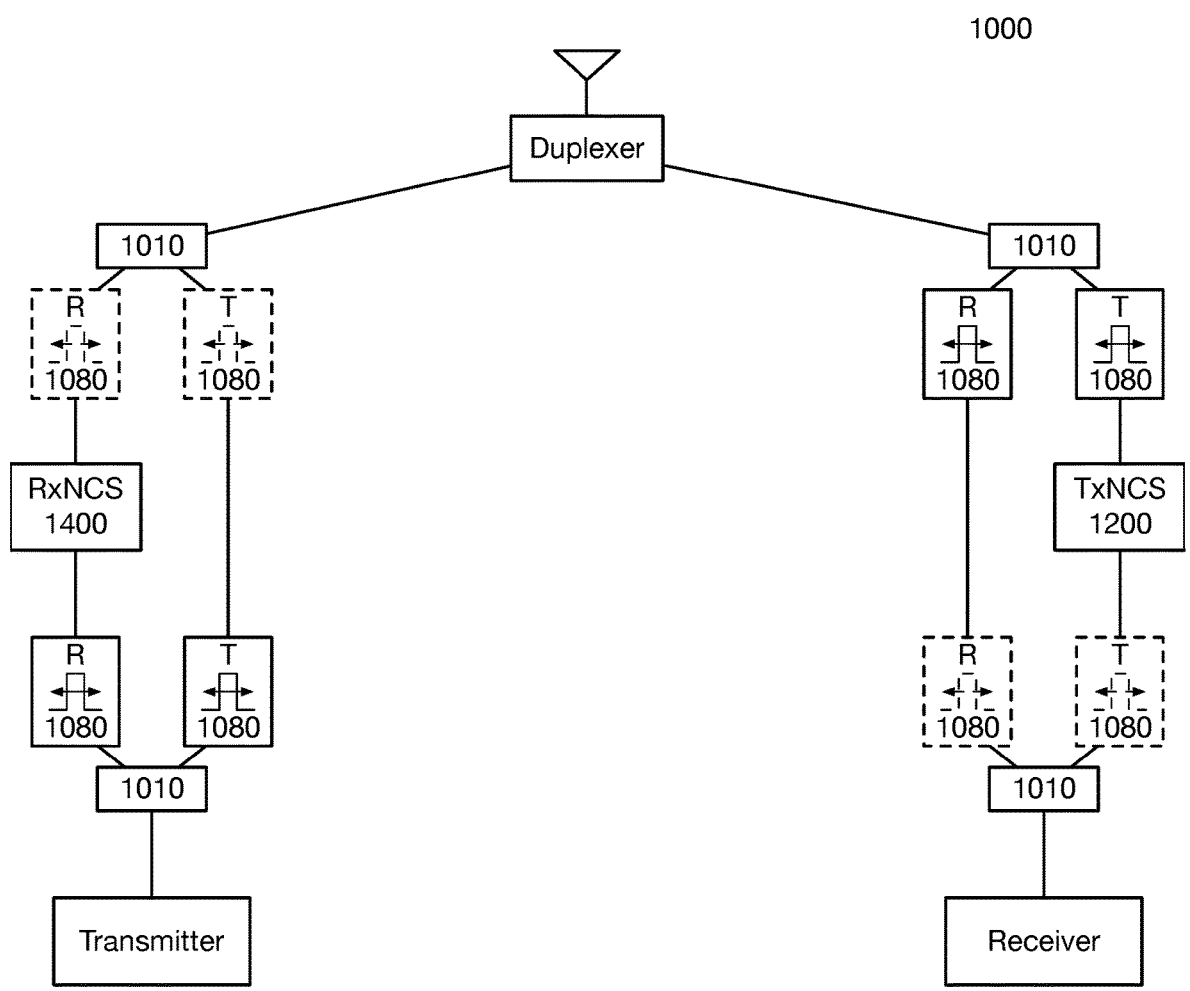
FIG. 2 is a diagram representation of a system of an invention embodiment.

As shown in FIG. 2, the system 1000 may mitigate interference using the RxNCS 1400 to perform noise cancellation in the receive band on the transmit signal and the TxNCS 1200 to perform noise cancellation in the transmit band on the receive signal. In the example as shown in FIG. 2, the use of transmit and receive bandpass filters 1080 at each coupler 1010 enables the use of simple couplers 1010 (e.g., t-junctions).

Figure 3:
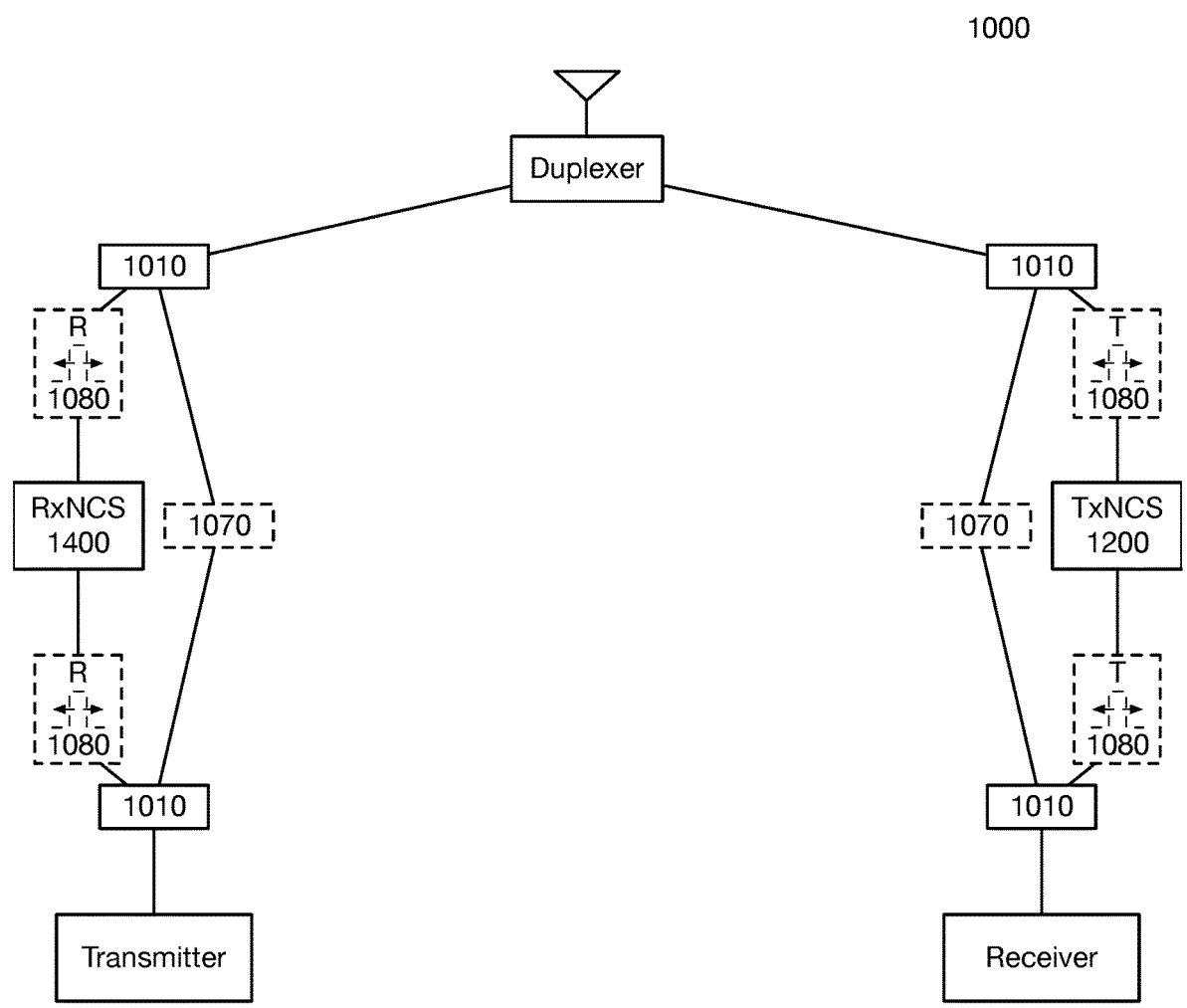
FIG. 3 is a diagram representation of a system of an invention embodiment.
Figure 4:
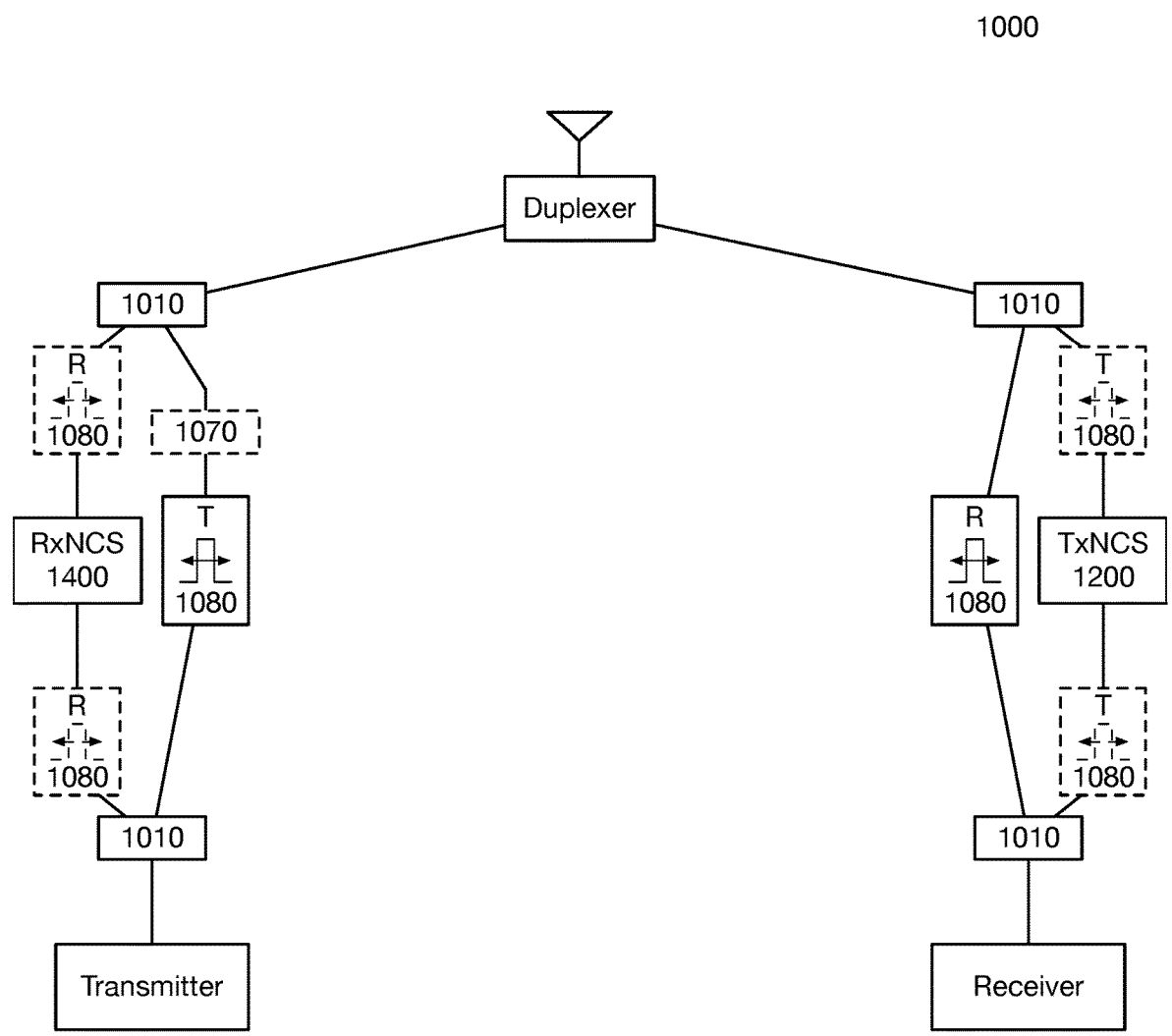
FIG. 4 is a diagram representation of a system of an invention embodiment.

If more complex couplers 1010 are to be used (e.g., short section directional transmission line coupler), the number of filters 1080 used may be reduced, as shown in FIGS. 3 and 4. In the example as shown in FIG. 3, there are no transmit band filters 1080 on the transmit side and no receive band filters 1080 on the receive side (though such filtering may be performed, for example, by a duplexer or the transmitter), further, the remaining filters 1080 may be optionally included. Time delays 1070 may also be optionally included (to account for delay induced by filtering and the RxNCS 1400/RxNCS 1200). In the example as shown in FIG. 4, additional (as compared to FIG. 3) filters 1080 are used (potentially, in part, to reduce difference in time/phase delay between branches of the transmit line and branches of the receive line).

Couplers 1010 may additionally or alternatively incorporate additional circuitry to perform matching between connections (e.g., impedance matching, delay matching, etc.). Such circuitry may include gain circuitry, attenuation circuitry, time delay circuitry, phase delay circuitry, and/or any circuitry capable of port matching or otherwise enhancing coupling.

Note that a combination of filters 1080, couplers 1010, and/or matching circuitry may function as or function to replace a duplexer.

Figure 5:
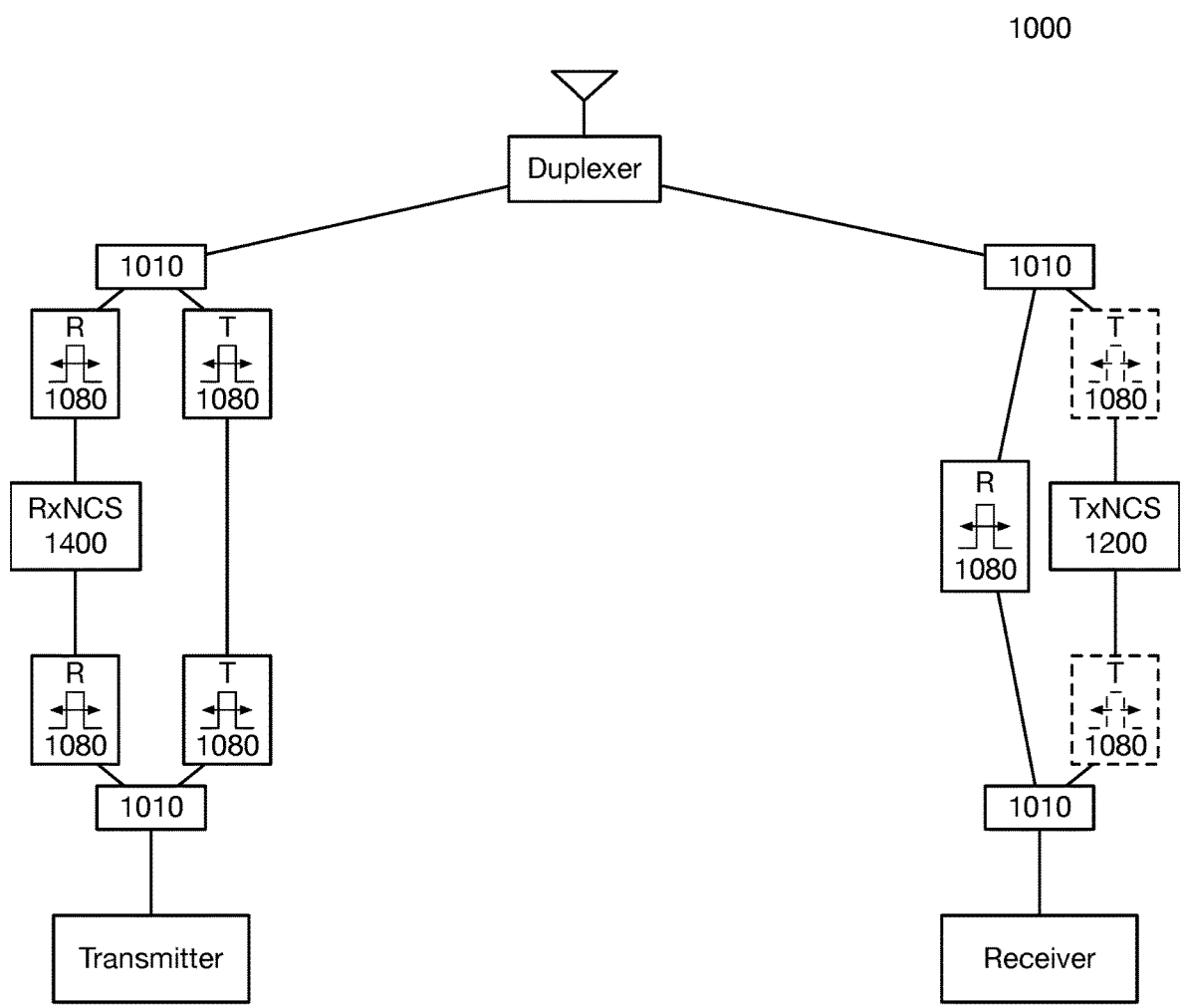
FIG. 5 is a diagram representation of a system of an invention embodiment.

While the examples as shown in FIG. 2-4 are mirrored on the transmit and receive side, it is understood that the system 1000 may use any combination of such architectures; for example, as shown in FIG. 5.

Figure 6A:
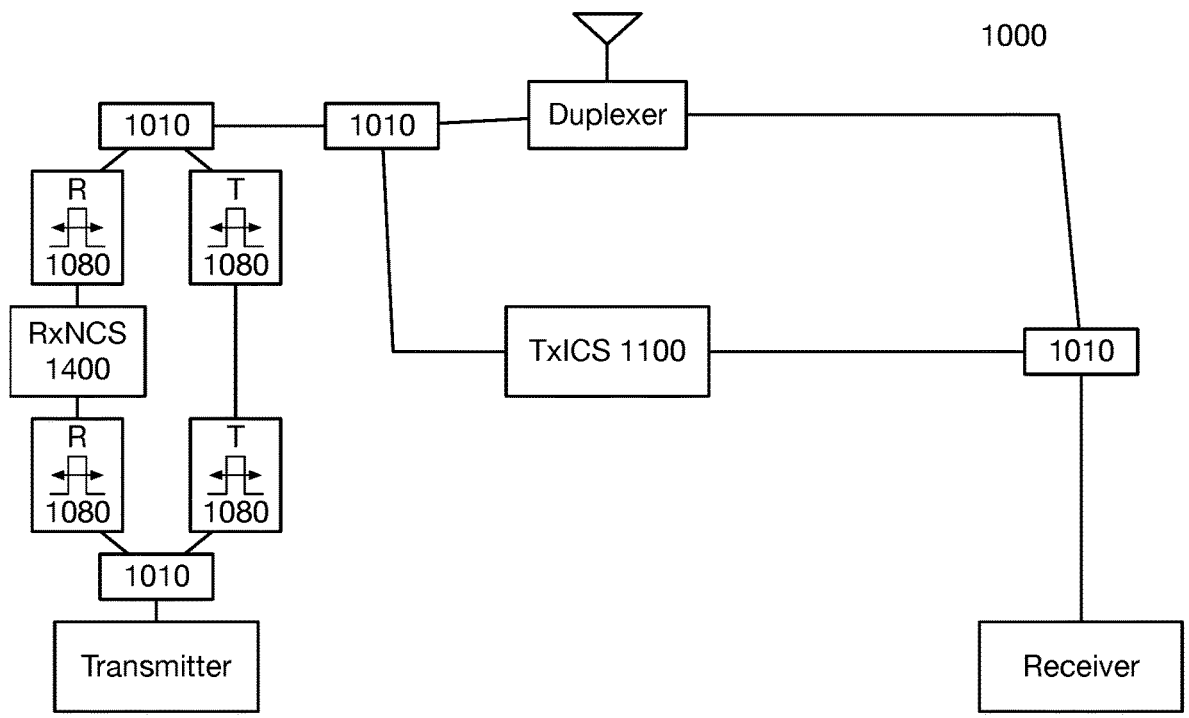
FIG. 6A is a diagram representation of a system of an invention embodiment.
Figure 6B:
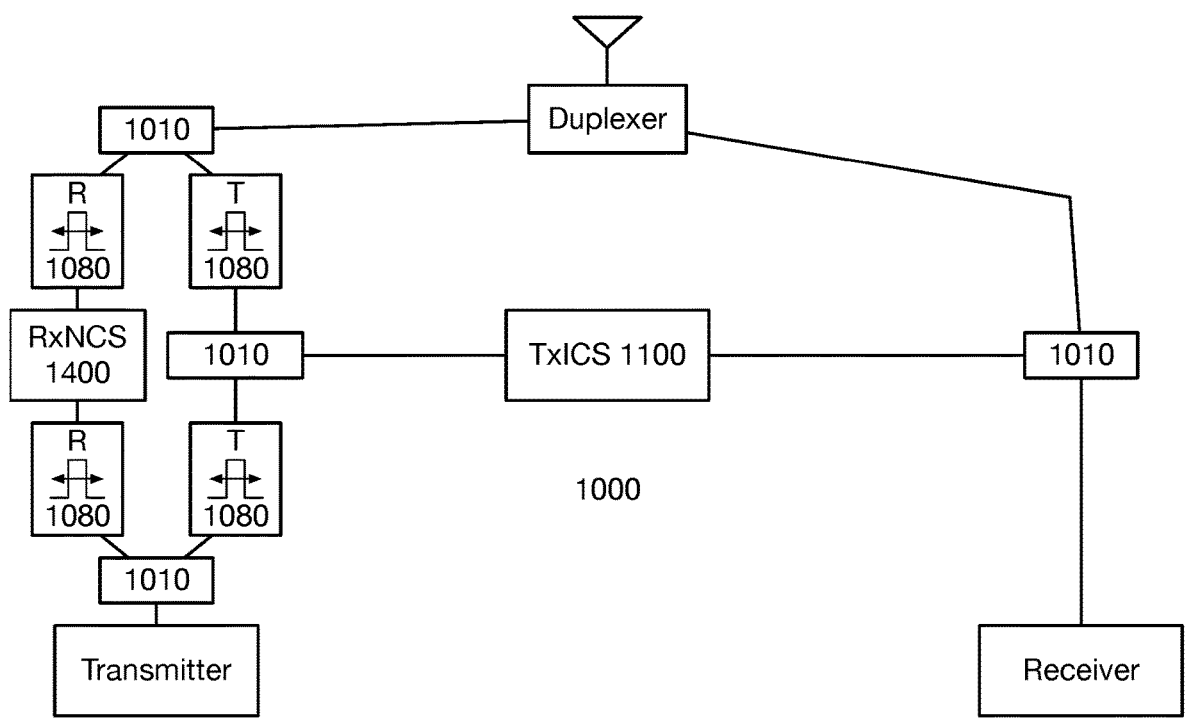
FIG. 6B is a diagram representation of a system of an invention embodiment.

As shown in FIGS. 6A and 6B, the system 1000 may include a combination of interference cancellation systems and noise cancellation systems. For example, as shown in FIG. 6A, the RxNCS 1400 may reduce the amount of interference in the receive band seen both at the receiver (as a consequence of that interference being removed prior to antenna transmission) and at the TxICS 1100 (which may result in a higher-quality self-interference cancellation signal or easier operation of the TxICS 1100). While these two FIGUREs exemplify some filtering and coupling schemes, it is understood that the system 1000 may utilize any configuration of filters 1080 and couplers 1010.

Figure 7A:
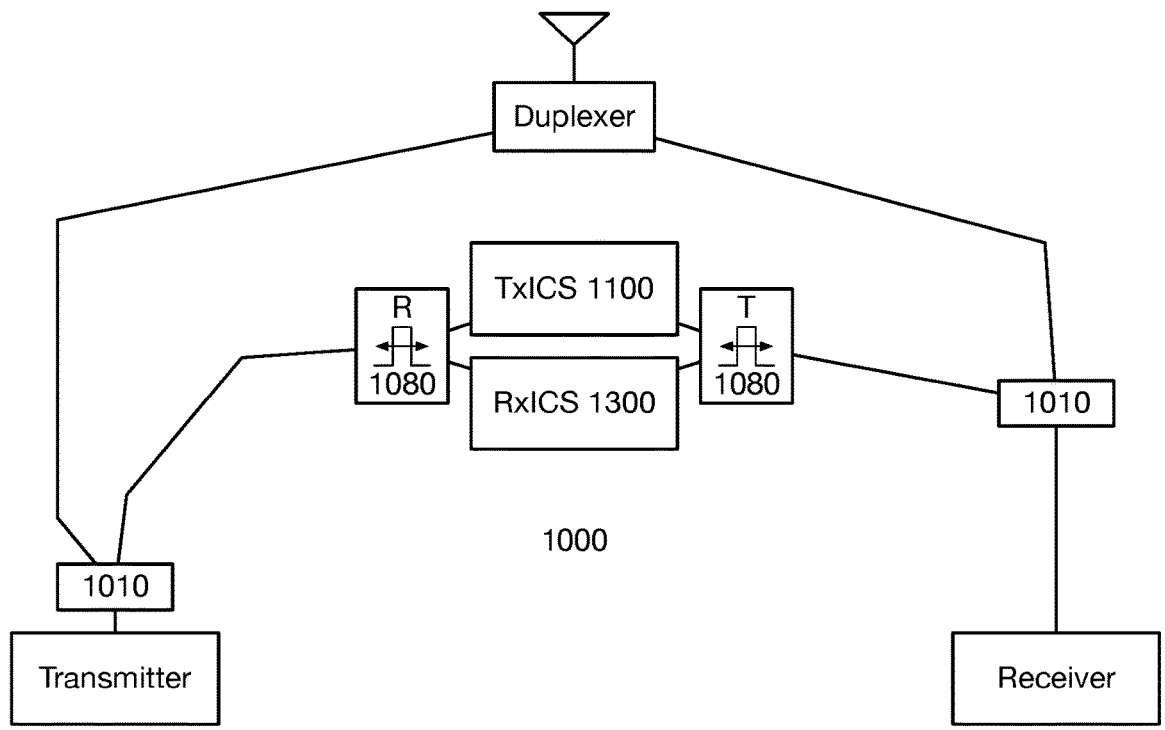
FIG. 7A is a diagram representation of a system of an invention embodiment.
Figure 7B:
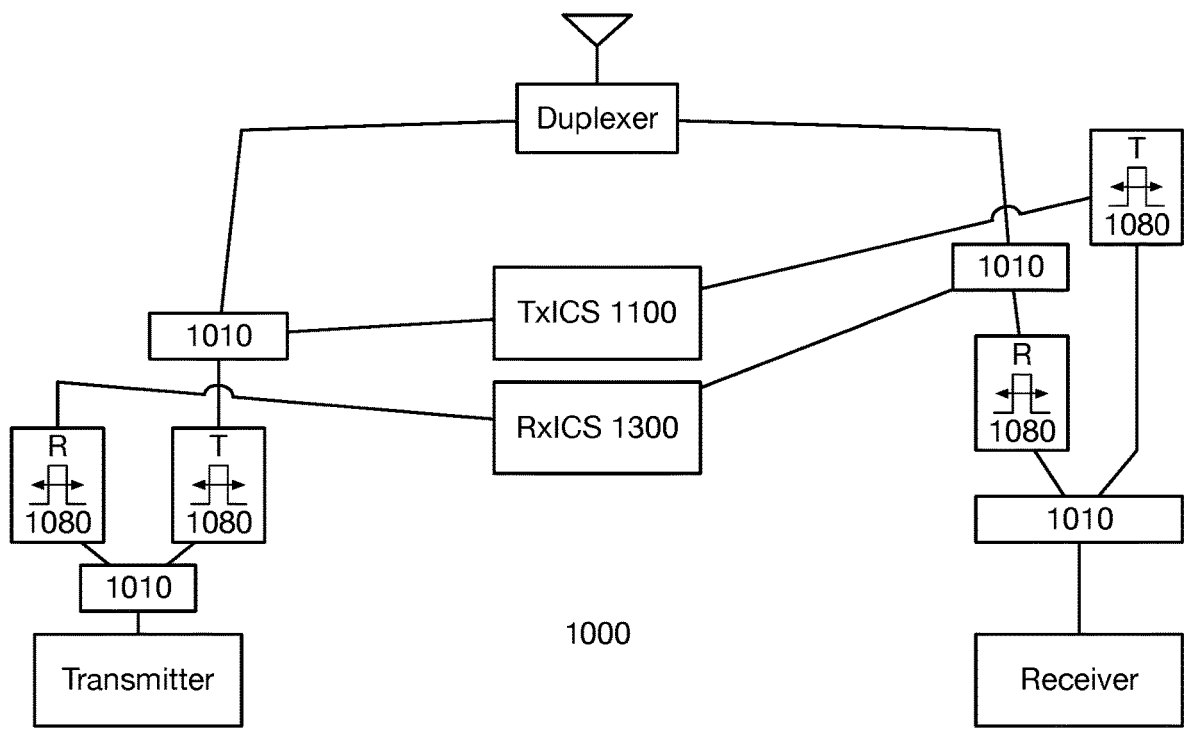
FIG. 7B is a diagram representation of a system of an invention embodiment.

As shown in FIGS. 7A and 7B, the system 1000 may include a combination of TxICS 1100 and RxICS 1300 cancellation without including either of the TxNCS 1200 and RxNCS 1400. As shown in FIGS. 7A and 7B, the TxICS 1100 and RxICS 1300 may benefit from filtering at or after couplers 1010. Effects of such filtering may include reducing the overall power seen at an ICS and reducing insertion loss for a frequency band of interest. While these two FIGUREs exemplify some filtering and coupling schemes, it is understood that the system 1000 may utilize any configuration of filters 1080 and couplers 1010.

Figure 8A:
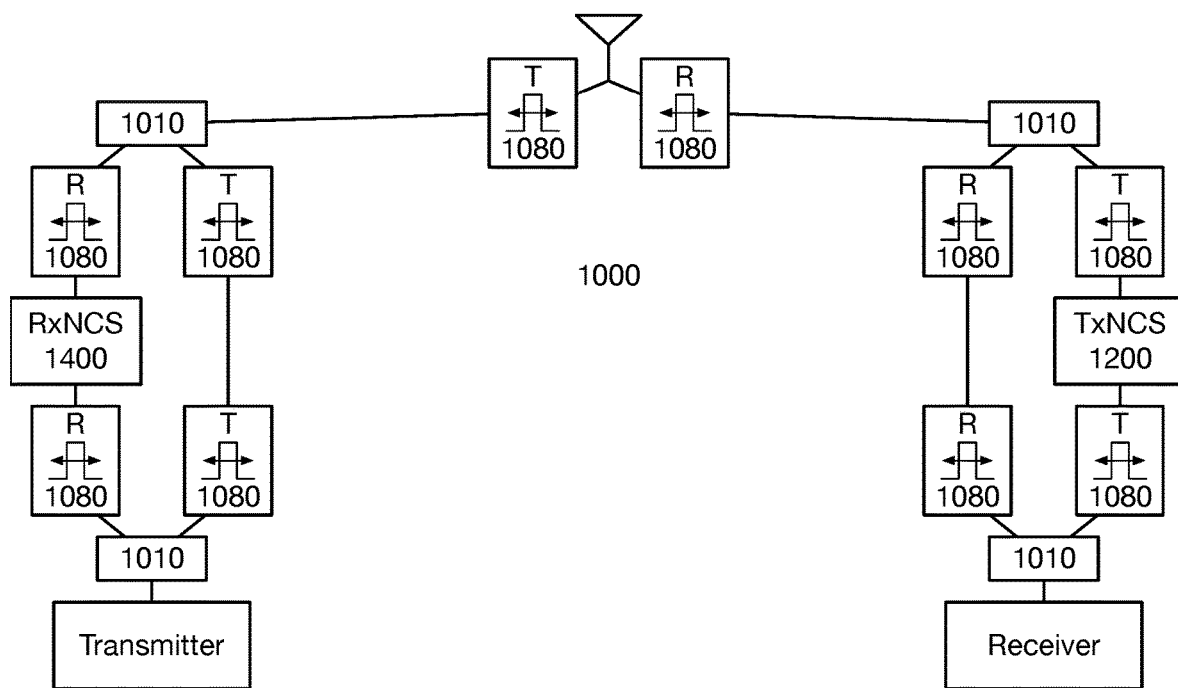
FIG. 8A is a diagram representation of a system of an invention embodiment.
Figure 8B:
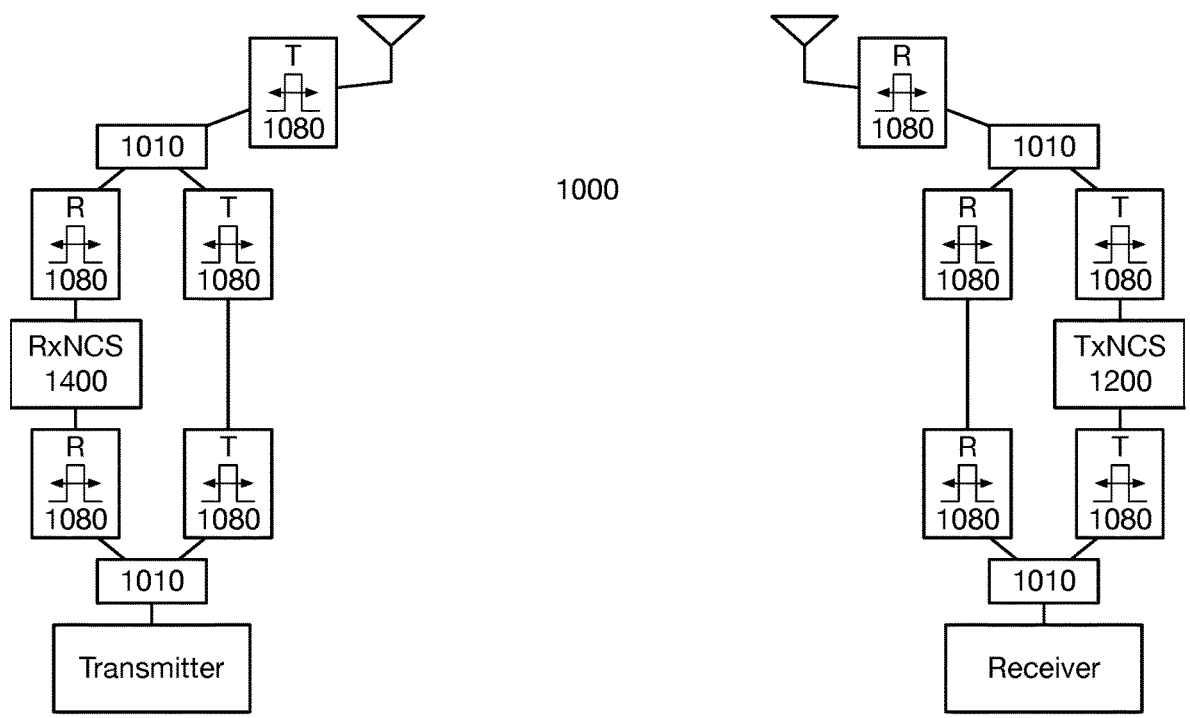
FIG. 8B is a diagram representation of a system of an invention embodiment.

While previous example of the system 1000 show a duplexer linking transmit and receive paths to a single antenna, the system 1000 may couple to one or multiple antennas in any manner. For example, as shown in FIG. 8A, a set of bandpass filters and a coupler to a single antenna may replace the duplexer. As shown in FIG. 8B, transmit and receive paths may be coupled to separate antennas. This architecture may also be extended to MIMO, in which case multiple antennas may be connected to transmit and receive paths in any manner.

The system 1000 is preferably coupled to or integrated with a receiver that functions to receive analog receive signals transmitted over a communications link (e.g., a wireless channel, a coaxial cable). The receiver preferably converts analog receive signals into digital receive signals for processing by a communications system, but may additionally or alternatively not convert analog receive signals (passing them through directly without conversion).

The receiver is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver may be coupled to the communications link by a circulator-coupled RF antenna.

The receiver preferably includes an ADC 1050 (described in following sections) and converts baseband analog signals to digital signals. The receiver may additionally or alternatively include an integrated amplifier 1020 and/or a frequency downconverter 1040 (enabling the receiver to convert RF or other analog signals to digital).

The system 1000 is preferably coupled to or integrated with a transmitter that functions to transmit signals of the communications system over a communications link to a second communications system. The transmitter preferably converts digital transmit signals into analog transmit signals.

The transmitter is preferably coupled to the communications link by a duplexer-coupled RF antenna, but may additionally or alternatively be coupled to the communications link in any suitable manner. Some examples of alternative couplings include coupling via one or more dedicated transmit antennas, dual-purpose transmit and/or receive antennas, or any other suitable antennas. In other alternative couplings, the transmitter may be coupled to the communications link by direct wired coupling (e.g., through one or more RF coaxial cables, transmission line couplers, etc.).

The transmitter preferably includes a DAC 1060 (described in following sections) and converts digital signals to baseband analog signals. The transmitter may additionally or alternatively include an integrated amplifier 1020 and/or a frequency upconverter 1030 (enabling the transmitter to convert digital signals to RF signals and/or intermediate frequency (IF) signals).

The transmitter and receiver may be coupled to the same communicating device or different communicating devices. In some variations, there may be multiple transmitters and/or receivers, which may be coupled to the same or different communication devices in any suitable combination.

Signal couplers 1010 function to allow analog signals to be split and/or combined. While not necessarily shown in the figures, signal couplers are preferably used at each junction (e.g., splitting, combining) of two or more analog signals; alternatively, analog signals may be coupled, joined, or split in any manner. In particular, signal couplers 1010 may be used to provide samples of transmit signals, as well as to combine interference cancellation signals with other signals (e.g., transmit or receive signals). Alternatively, signal couplers 1010 may be used for any purpose. Signal couplers 1010 may couple and/or split signals using varying amounts of power; for example, a signal coupler 1010 intended to sample a signal may have an input port, an output port, and a sample port, and the coupler 1010 may route the majority of power from the input port to the output port with a small amount going to the sample port (e.g., a 99.9%/0.1% power split between the output and sample port, or any other suitable split).

The signal coupler 1010 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 1010 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 1010 are preferably phase-shifted by ninety degrees, but may additionally or alternatively be in phase or phase shifted by a different amount.

Amplifiers 1020 function to amplify signals of the system 1000. Amplifiers may include any analog or digital amplifiers. Some examples of amplifiers 1020 include low-noise amplifiers (LNA) typically used to amplify receive signals and power amplifiers (PA) typically used to amplify transmit signals prior to transmission.

Frequency upconverters 1030 function to upconvert a carrier frequency of an analog signal (typically from baseband to RF, but alternatively from any frequency to any other higher frequency). Upconverters 1030 preferably accomplish signal upconversion using heterodyning methods, but may additionally or alternatively use any suitable upconversion methods.

The upconverter 1030 preferably includes a local oscillator (LO), a mixer, and a bandpass filter. The local oscillator functions to provide a frequency shift signal to the mixer; the mixer combines the frequency shift signal and the input signal to create (usually two, but alternatively any number) frequency shifted signals, one of which is the desired output signal, and the bandpass filter rejects signals other than the desired output signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog integrated circuits (ICs), digital ICs, and/or any other suitable components. The mixer preferably functions to combine two or more electrical input signals into one or more composite outputs, where each output includes some characteristics of at least two input signals.

The bandpass filter (of the upconverter) is preferably a tunable bandpass filter centered around an adjustable radio frequency. Additionally, or alternatively, the bandpass filter may be a bandpass filter centered around a set radio frequency, or any other suitable type of filter. The bandpass filter is preferably a passive filter, but may additionally or alternatively be an active filter. The bandpass filter is preferably implemented with analog circuit components, but may additionally or alternatively be digitally implemented.

In variations in which the bandpass filter is tunable, the center frequency of each tunable filter is preferably controlled by a control circuit or tuning circuit, but may additionally or alternatively be controlled by any suitable system (including manually controlled, e.g. as in a mechanically tuned capacitor). Each tunable bandpass filter preferably has a set quality (Q) factor, but may additionally or alternatively have a variable Q factor. The tunable bandpass filters may have different Q factors; for example, some of the tunable filters may be high-Q, some may be low-Q, and some may be no-Q (flat response).

Frequency downconverters 1040 function to downconvert the carrier frequency of an analog signal (typically to baseband, but alternatively to any frequency lower than the carrier frequency). The downconverter 1040 preferably accomplishes signal downconversion using heterodyning methods, but may additionally or alternatively use any suitable downconversion methods.

The downconverter 1040 preferably includes a local oscillator (LO), a mixer, and a baseband filter. The local oscillator functions to provide a frequency shift signal to the mixer; the mixer combines the frequency shift signal and the input signal to create (usually two) frequency shifted signals, one of which is the desired signal, and the baseband filter rejects signals other than the desired signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, a bandpass filter, or any other suitable type of filter. The baseband filter is preferably a passive filter, but may additionally or alternatively be an active filter. The baseband filter is preferably implemented with analog circuit components, but may additionally or alternatively be digitally implemented.

Note that the bandpass filter of the frequency upconverter 1030 and the baseband filter of the frequency downconverter 1040 are specific examples of a filter 1080.

Analog-to-digital converters (ADCs) 1050 function to convert analog signals (typically at baseband, but additionally or alternatively at any frequency) to digital signals. ADCs 1050 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

Digital-to-analog converters (DACs) 1060 function to convert digital signals to analog signals (typically at baseband, but additionally or alternatively at any frequency). The DAC 1060 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

Time delays 1070 function to delay signal components. Delays 1070 may be implemented in analog (e.g., as a time delay circuit) or in digital (e.g., as a time delay function). Delays 1070 may be fixed, but may additionally or alternatively introduce variable delays. The delay 1070 is preferably implemented as an analog delay circuit (e.g., a bucket-brigade device, a long transmission line, a series of RC networks) but may additionally or alternatively be implemented in any other suitable manner. If the delay 1070 is a variable delay, the delay introduced may be set by a tuning circuit or other controller of the system 1000. Although not necessarily explicitly shown in figures, delays 1070 may be coupled to the system 1000 in a variety of ways to delay one signal relative to another. For example, delays 1070 may be used to delay a receive or transmit signal to account for time taken to generate an interference cancellation signal (so that the two signals may be combined with the same relative timing). Delays 1070 may potentially be implemented as part of or between any two components of the system 1000.

Filters 1080 function to remove or reduce the presence of undesired frequency components within a signal. Each filter 1080 functions to transform signal components according to the response of the filter, which may introduce a change in signal magnitude, signal phase, and/or signal delay. Two specific previously mentioned examples of filters 1080 are discussed in the sections regarding the upconverter 1030 and the downconverter 1040.

Filters 1080 are preferably bandpass filters, but may be any type of filter (e.g., notch filter, bandstop filter, low-pass filter, high-pass filter). Filters 1080 are preferably analog resonant element filters, but may additionally or alternatively be any type of filter (including digital filters). Resonant elements of the filters 1080 are preferably formed by lumped elements, but may additionally or alternatively be distributed element resonators, ceramic resonators, SAW resonators, crystal resonators, cavity resonators, or any suitable resonators.

The filters 1080 are preferably tunable such that one or more peaks of the filter 1080 may be shifted. In one implementation of a preferred embodiment, one or more resonant elements of the filter 1080 may include a variable shunt capacitance (e.g., a varactor or a digitally tunable capacitor) that enables filter peaks to be shifted. Additionally or alternatively, filters 1080 may be tunable by quality factor (i.e., Q may be modified by altering circuit control values), or filters 1080 may be not tunable.

Filters 1080 may include, in addition to resonant elements, delayers, phase shifters, and/or scaling elements.

The filters 1080 are preferably passive filters, but may additionally or alternatively be active filters. The filters 1080 are preferably implemented with analog circuit components, but may additionally or alternatively be digitally implemented. The center frequency of any tunable peak of a filter 1080 is preferably controlled by a tuning circuit, but may additionally or alternatively be controlled by any suitable system (including manually controlled, e.g. as in a mechanically tuned capacitor).

In particular, filters 1080 may be useful to reduce insertion loss within a frequency range of interest. For example, as shown in FIG. 2, the insertion loss for the transmit path prior to the duplexer (at the transmit frequency) may be less than if the RxNCS 1400 were directly coupled to the transmit line in the absence of the four shown filters 1080.

Filters 1080 may also be useful to reduce the power seen by noise and/or interference cancellation systems. For example, as shown in FIG. 2, the RxNCS 1400 sees a lower total overall power than if the RxNCS 1400 were directly coupled to the transmit line in the absence of the four shown filters 1080.

Note that used to enhance interference and/or noise cancellation, as opposed to independently suppressing noise (as a filter may be used for in a system without interference and/or noise cancellation), a less-expensive, smaller, lower-quality factor (Q), and/or lower-rejection-capability filter may be used.

The TxICS 1100 functions to mitigate interference present in the transmit band of a signal using self-interference cancellation techniques; that is, generating a self-interference cancellation signal by transforming signal samples of a first signal (typically a transmit signal) into a representation of self-interference present in another signal (e.g., a receive signal, a transmit signal after amplification, etc.), due to transmission of the first signal and then subtracting that interference cancellation signal from the other signal.

The TxICS 1100 is preferably used to cancel interference present in the transmit band of a receive signal; i.e., the TxICS 1100 generates an interference cancellation signal from samples of a transmit signal using a circuit that models the representation of the transmit signal, in the transmit band, as received by a receiver, and subtracts that cancellation signal from the receive signal.

The TxICS 1100 may additionally be used to cancel interference present in the transmit band (TxB) of a transmit signal sample; i.e., the TxICS 1100 generates an interference cancellation signal from samples of a transmit signal using a circuit that models the representation of the transmit signal, in the transmit band, as generated by a transmitter (generally, but not necessarily, before transmission at an antenna), and subtracts that cancellation signal from the transmit signal sample. This type of interference cancellation is generally used to 'clean' a transmit signal sample; that is, to remove transmit band signal of a transmit sample, so that the sample contains primarily information in the receive band (allowing the sample to be used to perform receive-band interference cancellation, typically using the RxICS 1300).

The TxICS 1100 comprises at least one of a digital TX interference canceller (TxDC) 1110 and an analog TX interference canceller (TxAC) 1120. In the case that the TxICS 1100 performs both receive signal cancellation and transmit sample cancellation, the TxICS 1100 may include separate cancellers to perform these tasks; additionally or alternatively, the TxICS 1100 may include any number of cancellers for any purpose (e.g., one canceller performs both tasks, many cancellers perform a single task, etc.).

The TxDC 1110 functions to produce a digital interference cancellation signal from a digital input signal according to a digital transform configuration. The TxDC 1110 may be used to cancel interference in any signal, using any input, but the TxDC 1110 is preferably used to cancel transmit band interference in an analog receive signal (by converting a digital interference cancellation signal to analog using a DAC 1060 and combining it with the analog receive signal). The TxDC 1110 may also be used to cancel transmit band signal components in a transmit signal (to perform transmit signal cleaning as previously described).

Using upconverters 1030, downconverters 1040, ADCs 1050, and DACs 1060, the TxDC 1110 may convert analog signals of any frequency to digital input signals, and may additionally convert interference cancellation signals from digital to analog signals of any frequency.

The digital transform configuration of the TxDC 1110 includes settings that dictate how the TxDC 1110 transforms a digital transmit signal to a digital interference signal (e.g. coefficients of a generalized memory polynomial used to transform a transmit signal to an interference cancellation signal). The transform configuration for a TxDC 1110 is preferably set adaptively by a transform adaptor, but may additionally or alternatively be set by any component of the system 1000 (e.g., a tuning circuit) or fixed in a set transform configuration.

The TxDC 1110 is preferably substantially similar to the digital self-interference canceller of U.S. Provisional Application No. 62/268,388, the entirety of which is incorporated by this reference, except in that the TxDC 1110 is not necessarily applied solely to cancellation of interference in a receive signal resulting from transmission of another signal (as previously described).

Figure 9:
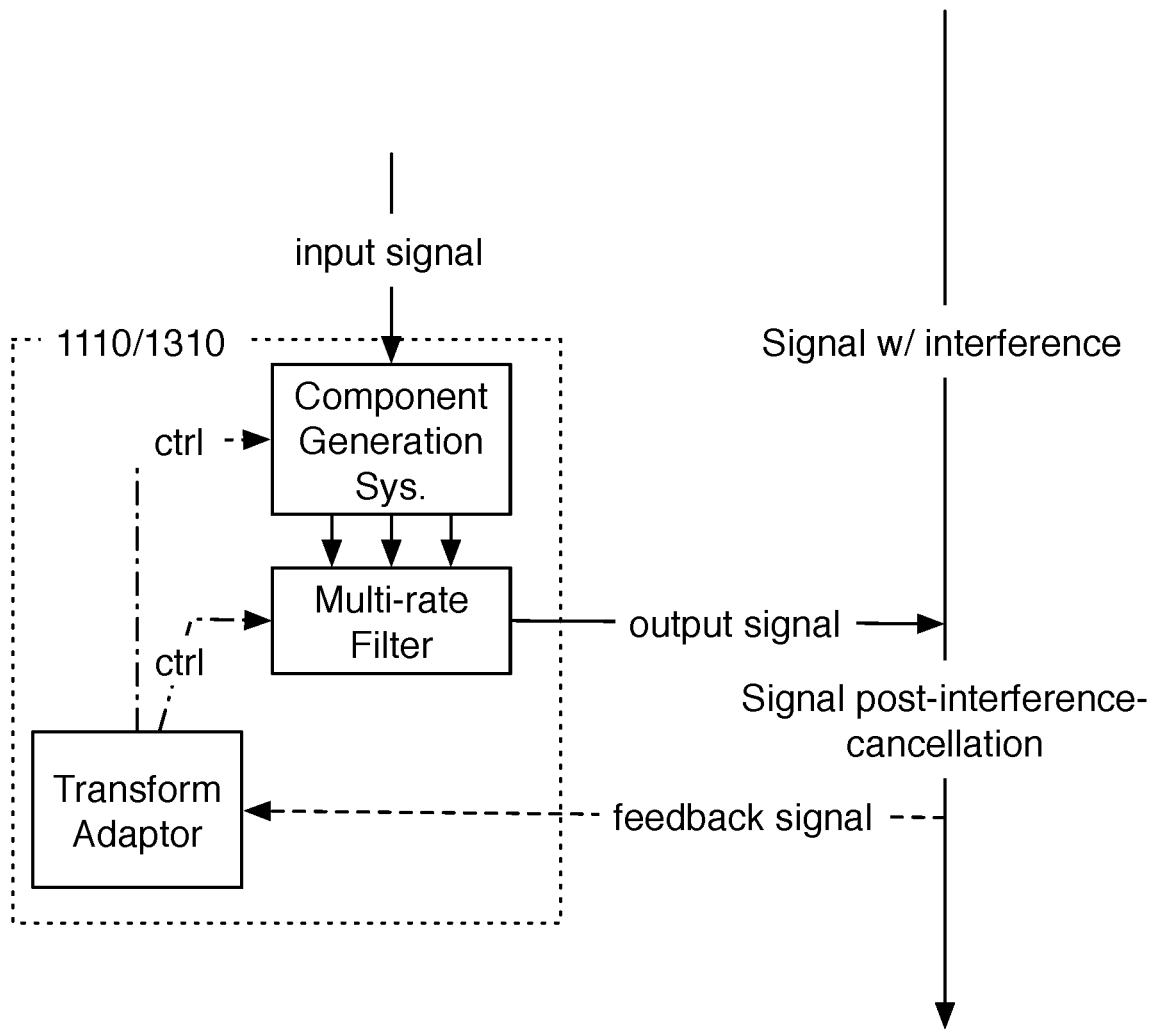
FIG. 9 is a diagram representation of a digital interference canceller of a system of an invention embodiment.

In one implementation of a preferred embodiment, the TxDC 1110 includes a component generation system, a multi-rate filter, and a transform adaptor, as shown in FIG. 9.

The component generation system functions to generate a set of signal components from the sampled input signal (or signals) that may be used by the multi-rate filter to generate an interference cancellation signal. The component generation system preferably generates a set of signal components intended to be used with a specific mathematical model (e.g., generalized memory polynomial (GMP) models, Volterra models, and Wiener-Hammerstein models); additionally or alternatively, the component generation system may generate a set of signal components usable with multiple mathematical models.

In some cases, the component generator may simply pass a copy of a sampled transmit signal unmodified; this may be considered functionally equivalent to a component generator not being explicitly included for that particular path.

The multi-rate adaptive filter functions to generate an interference cancellation signal from the signal components produced by the component generation system. In some implementations, the multi-rate adaptive filter may additionally function to perform sampling rate conversions (similarly to an upconverter 1030 or downconverter 1040, but applied to digital signals). The multi-rate adaptive filter preferably generates an interference cancellation signal by combining a weighted sum of signal components according to mathematical models adapted to model interference contributions of the transmitter, receiver, channel and/or other sources. Examples of mathematical models that may be used by the multi-rate adaptive filter include generalized memory polynomial (GMP) models, Volterra models, and Wiener-Hammerstein models; the multi-rate adaptive filter may additionally or alternatively use any combination or set of models.

The transform adaptor functions to set the transform configuration of the multi-rate adaptive filter and/or the component generation system. The transform configuration preferably includes the type of model or models used by the multi-rate adaptive filter as well as configuration details pertaining to the models (each individual model is a model type paired with a particular set of configuration details). For example, one transform configuration might set the multi-rate adaptive filter to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation system and/or the multi-rate adaptive filter. For example, if the signal component generation system includes multiple transform paths, the transform adaptor may set the number of these transform paths, which model order their respective component generators correspond to, the type of filtering used, and/or any other suitable details. In general, the transform configuration may include any details relating to the computation or structure of the signal component generation system and/or the multi-rate adaptive filter.

The transform adaptor preferably sets the transform configuration based on a feedback signal sampled from a signal post-interference-cancellation (i.e., a residue signal). For example, the transform adaptor may set the transform configuration iteratively to reduce interference present in a residue signal. The transform adaptor may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

Note that TxDCs 1110 may share transform adaptors and/or other components (although each TxDC 1110 is preferably associated with its own transform configuration).

The TxAC 1120 functions to produce an analog interference cancellation signal from an analog input signal. The TxAC 1120 may be used to cancel interference in any signal, using any input, but the TxAC 1120 is preferably used to cancel transmit band interference in an analog receive signal. The TxAC 1120 may also be used to cancel transmit band signal components in a transmit signal sample (to perform transmit signal cleaning as previously described).

Using upconverters 1030, downconverters 1040, ADCs 1050, and DACs 1060, the TxAC 1120 may convert digital signals to analog input signals, and may additionally convert interference cancellation signals from analog to digital (or to another analog signal of different frequency).

The TxAC 1120 is preferably designed to operate at a single frequency band, but may additionally or alternatively be designed to operate at multiple frequency bands. The TxAC 1120 is preferably substantially similar to the circuits related to analog self-interference cancellation of U.S. patent application Ser. No. 14/569,354 (the entirety of which is incorporated by this reference); e.g., the RF self-interference canceller, the IF self-interference canceller, associated up/downconverters, and/or tuning circuits, except that the TxAC 1120 is not necessarily applied solely to cancellation of interference in a receive signal resulting from transmission of another signal (as previously described).

The TxAC 1120 is preferably implemented as an analog circuit that transforms an analog input signal into an analog interference cancellation signal by combining a set of filtered, scaled, and/or delayed versions of the analog input signal, but may additionally or alternatively be implemented as any suitable circuit. For instance, the TxAC 1120 may perform a transformation involving only a single version, copy, or sampled form of the analog input signal. The transformed signal (the analog interference cancellation signal) preferably represents at least a part of an interference component in another signal.

The TxAC 1120 is preferably adaptable to changing self-interference parameters in addition to changes in the input signal; for example, transceiver temperature, ambient temperature, antenna configuration, humidity, and transmitter power. Adaptation of the TxAC 1120 is preferably performed by a tuning circuit, but may additionally or alternatively be performed by a control circuit or other control mechanism included in the canceller or any other suitable controller (e.g., by the transform adaptor of the TxDC 1110).

Figure 10:
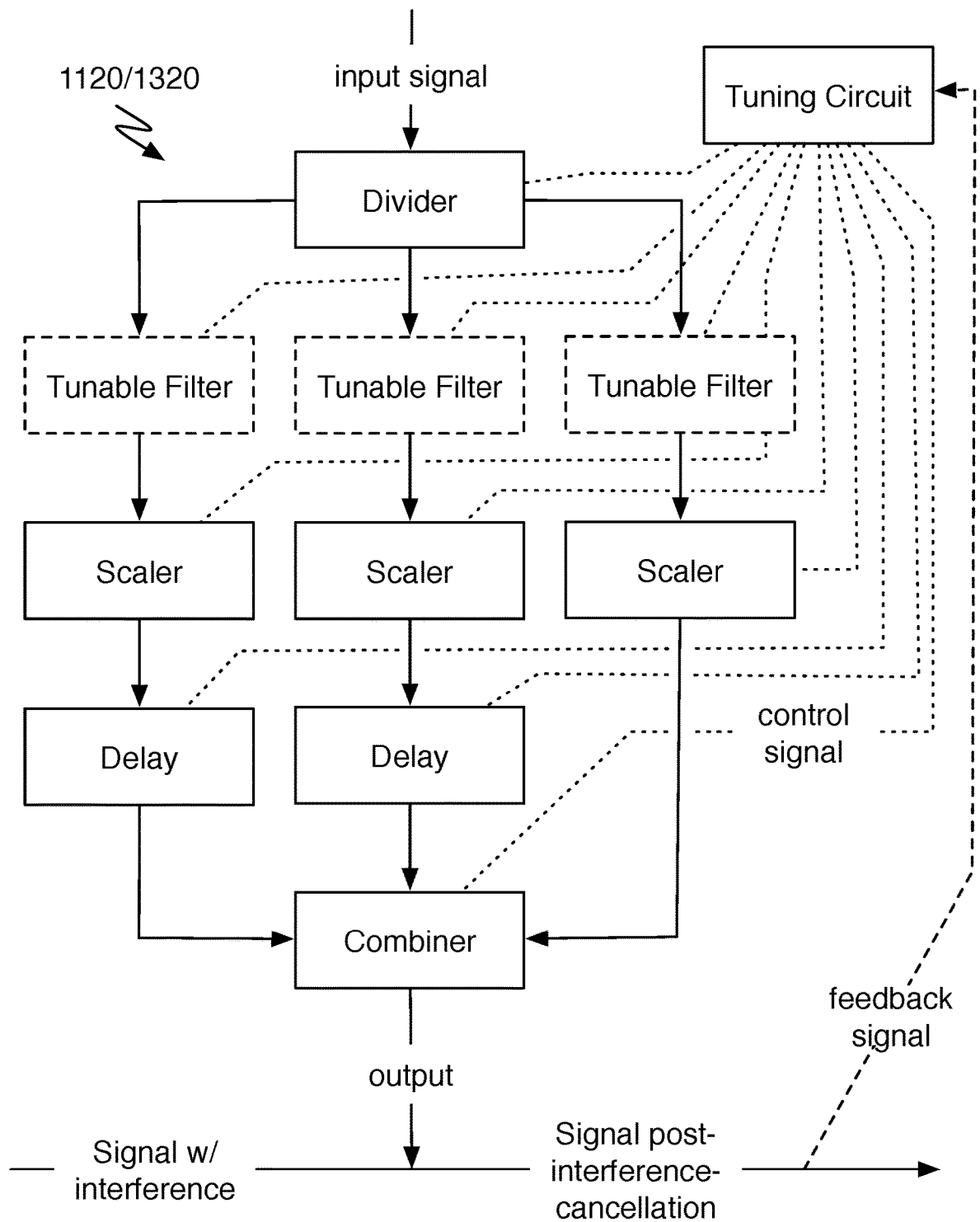
FIG. 10 is a diagram representation of an analog interference canceller of a system of an invention embodiment.

In one implementation of a preferred embodiment, the TxAC 1120 includes a set of scalers (which may perform gain, attenuation, or phase adjustment), a set of delays, a signal combiner, a signal divider, and a tuning circuit, as shown in FIG. 10. In this implementation the TxAC 1120 may optionally include tunable filters (e.g., bandpass filters including an adjustable center frequency, lowpass filters including an adjustable cutoff frequency, etc.).

The tuning circuit preferably adapts the TxAC 1120 configuration (e.g., parameters of the filters, scalers, delayers, signal divider, and/or signal combiner, etc.) based on a feedback signal sampled from a signal after interference cancellation is performed (i.e., a residue signal). For example, the tuning circuit may set the TxAC 1120 configuration iteratively to reduce interference present in a residue signal. The tuning circuit preferably adapts configuration parameters using online gradient-descent methods (e.g., LMS, RLMS), but configuration parameters may additionally or alternatively be adapted using any suitable algorithm. Adapting configuration parameters may additionally or alternatively include alternating between a set of configurations. Note that TxACs may share tuning circuits and/or other components (although each TxAC 1120 is preferably associated with a unique configuration or architecture). The tuning circuit may be implemented digitally and/or as an analog circuit.

The TxNCS 1200 functions to mitigate interference present in the transmit band of a signal by performing noise cancellation in the transmit band. The TxNCS 1200 is preferably used to cancel noise present in the transmit band of a receive signal. The TxNCS 1200 may additionally or alternatively be used to cancel noise present in the transmit band of a transmit signal sample; e.g., to generate a transmit signal sample that includes primarily signal components in the receive band (as a way to estimate interference generated in the receive band of the receive signal by the transmit signal). Transmit samples cleaned in this way may be used to perform receive-band interference cancellation, typically using the RxICS 1300.

The TxNCS 1200 preferably generates a noise cancellation signal from the transmit band of a signal that is combined with the signal to reduce noise. For example, the TxNCS 1200 may sample the receive signal (e.g., post filtering by a transmit bandpass filter 1080) and generate a noise cancellation signal then combined with the receive signal to reduce signal power of the receive signal in the transmit band. Note that this approach may produce a greater reduction of undesired signal components than simple filtering. Note also that noise present in signals or added to signals may be referred to as noise components.

Figure 11A:
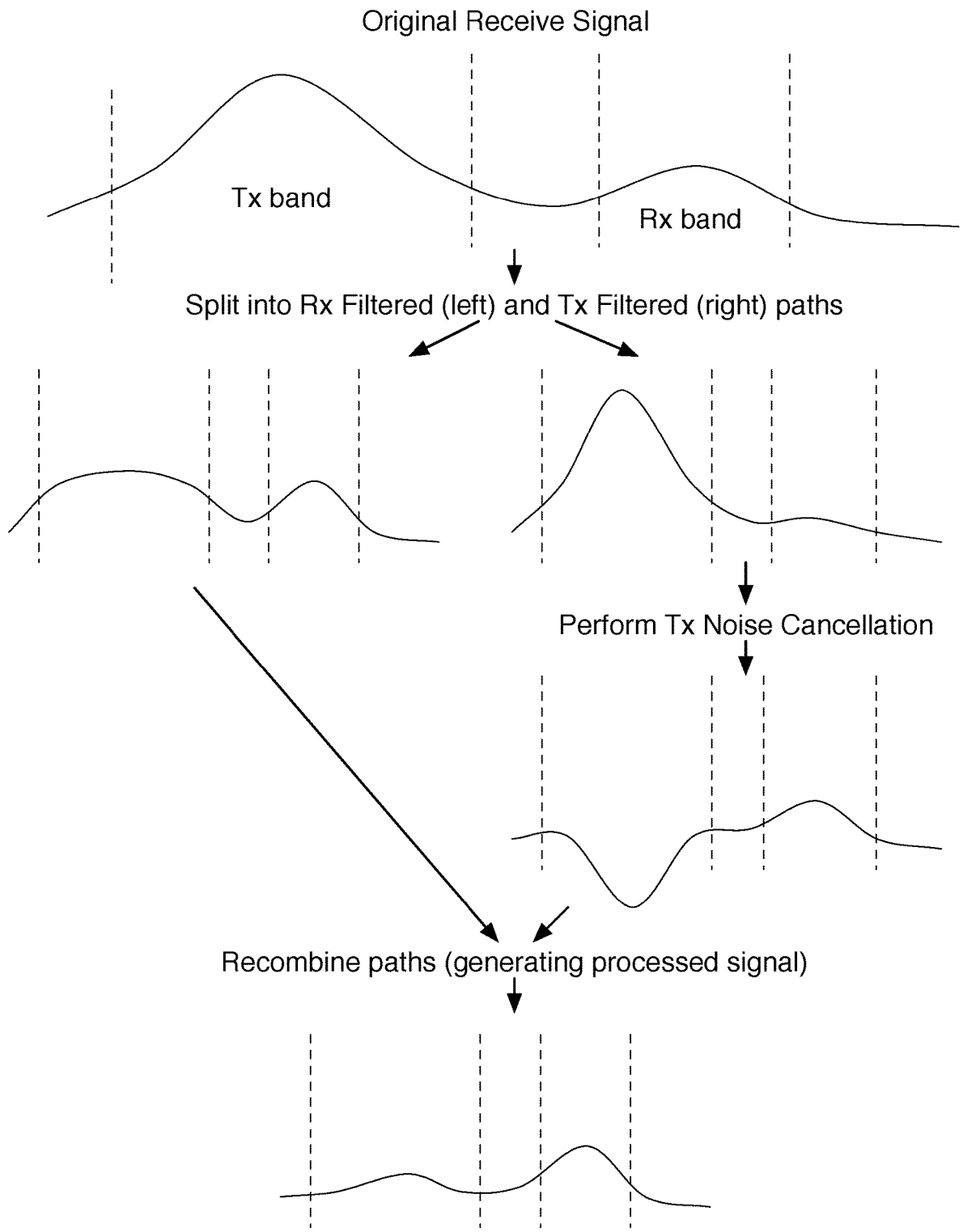
FIG. 11A is an example representation of noise cancellation of a system of an invention embodiment.
Figure 11B:
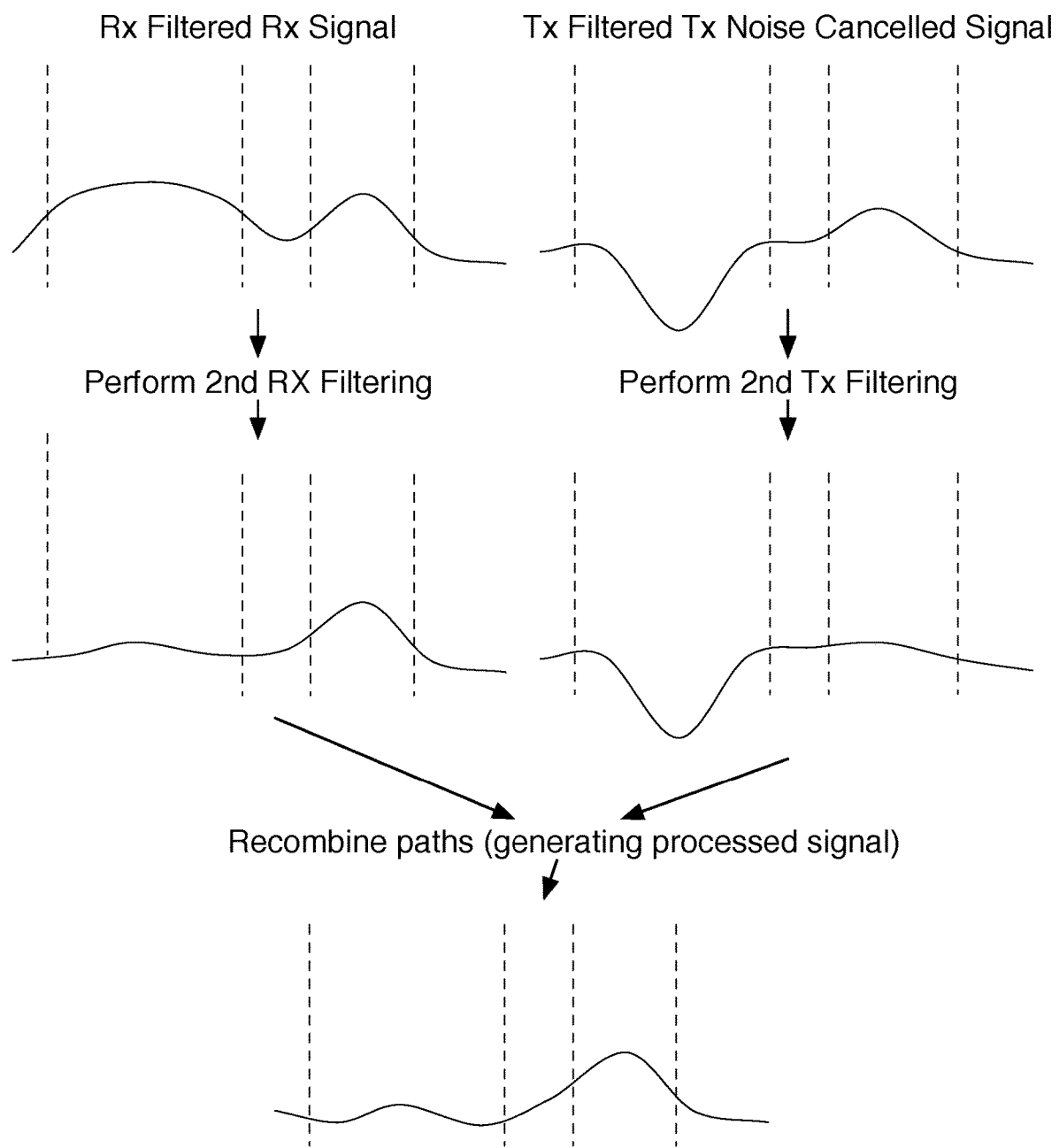
FIG. 11B is an example representation of noise cancellation of a system of an invention embodiment.

As previously noted, the TxNCS 1200 may be utilized with filters 1080 to enhance performance of the TxNCS 1200. For example, as shown in FIG. 11A (using the architecture as shown in FIG. 2) the receive signal is split by the first coupler 1010 and following Rx band and Tx band filters 1080 into a (primarily) receive band path and a (primarily) transmit band path. Note that the receive band path may still contain some transmit band power and vice versa. The TxNCS 1200 may then be used to generate a noise cancellation signal (from the transmit band path signal) and combine that signal with the transmit band path signal. In some cases, this noise cancellation may simply reduce power in the transmit band in the transmit band path signal. In other cases, (recognizing that not all of the transmit band power was removed from the receive band path) the noise cancellation may alternatively result in a signal with transmit band power 180 degrees out of phase with the original signal; this signal, when recombined with the receive path signal, may actually reduce overall signal power in the transmit band more than would be possible from filtering alone. Alternatively, the TxNCS 1200 (when simply reducing transmit band power) may act similarly to a filter (e.g., a notch filter) while still performing cancellation. Note that while not shown in FIG. 11A, a second filtering step may be performed before recombining the signals, as shown in FIG. 11B. This may be useful to reduce undesired contribution of TxNCS 1200 to power in the receive band. The recombined signal may be referred to as a "processed" signal.

Note also that the filters 1080 and the TxNCS 1200 each introduce delays to signals. It may be desirable for the filters 1080 and TxNCS 1200 to be configured or tuned such that the delay for signals on each path are equal (e.g., for the architecture as shown in FIG. 2, the delay on the receive side introduced by the two Rx bandpass filters may be equal to the delay introduced by the two Tx bandpass filters plus the delay introduced by the TxNCS 1200). Alternatively, filters or signal paths may insert any amount of time or phase delay. For example, as applied to the architecture as shown in FIG. 4, the delay on the receive side introduced by the one Rx bandpass filter may be equal to the delay introduced by the two Tx bandpass filters plus the delay introduced by the TxNCS 1200. As it may be not possible for the delays to be exactly equal, they may be substantially equal (e.g., the delay introduced by one may be within ten percent of the other).

The RxICS 1300 functions to mitigate interference present in the receive band of a signal using self-interference cancellation techniques; that is, generating a self-interference cancellation signal by transforming signal samples of a first signal (typically a transmit signal) into a representation of self-interference present in another signal, due to transmission of the first signal (e.g., a receive signal, a transmit signal after amplification, etc.) and then subtracting that interference cancellation signal from the other signal.

The RxICS 1300 is preferably used to cancel interference present in the receive band of a receive signal; i.e., the RxICs 1300 generates an interference cancellation signal from samples of receive band components of a transmit signal using a circuit that models the representation of the transmit signal, in the receive band, as received by a receiver, and subtracts that cancellation signal from the receive signal.

The RxICS 1300 comprises at least one of a digital RX interference canceller (RxDC) 1310 and an analog RX interference canceller (RxAC) 1320.

The RxDC 1310 is preferably substantially similar to the TxDC 1110, but may additionally or alternatively be any suitable digital interference canceller.

The RxAC 1320 is preferably substantially similar to the TxAC 1120, but may additionally or alternatively be any suitable analog interference canceller.

The RxNCS 1400 functions to mitigate interference present in the receive band of a signal by performing noise cancellation in the receive band. The RxNCS 1400 is preferably used to cancel noise present in the receive band of a transmit signal. Additionally or alternatively, the RxNCS 1400 may be used to pre-cancel noise present in the receive band of a transmit signal (e.g., pre-distorting a signal pre-amplification or filtering to account for later noise introduced by amplification and/or filtering).

The RxNCS 1400 preferably generates a noise cancellation signal from the receive band of a signal that is combined with the signal to reduce noise. For example, the RxNCS 1400 may sample the transmit signal (e.g., post filtering by a transmit bandpass filter 1080 and generate a noise cancellation signal thereafter combined with the transmit signal to reduce signal power of the transmit signal in the receive band. Note that this approach may produce a greater reduction of undesired signal components than simple filtering.

Similarly to the TxNCS 1200, the RxNCS 1400 may be utilized with filters 1080 to enhance performance of the RxNCS 1400.

Both the TxNCS 1200 and RxNCS 1400 may generate noise cancellation signals (or otherwise perform noise cancellation) in any manner (e.g., using techniques or architectures described for use by the TxICS 1100 and/or the RxICS 1300).

As a first example, the RxNCS 1400 may perform noise cancellation based on a static transformation (i.e., the noise cancellation signal is generated using a static transformation operating on the sampled signal; this may be useful if transmit circuit behavior is predictable). As a second example, the RxNCS 1400 may perform noise cancellation based on a dynamic transformation (e.g., like that of a tunable analog or digital ICS).

2. Tunable Out-of-band Interference Mitigation System for Relays and Co-located Transceivers A tunable out-of-band interference mitigation system 2000 for relays and co-located transceivers includes at least one of an interference cancellation system (ICS) 2100 and a noise cancellation system (NCS) 2200. The system 2000 may additionally include any number of additional elements to enable interference cancellation and/or filtering, including signal couplers 2010, amplifiers 2020, frequency upconverters 2030, frequency downconverters 2040, analog-to-digital converters (ADC) 2050, digital-to-analog converters (DAC) 2060, time delays 2070, filters 2080, and any other circuit components (e.g., phase shifters, attenuators, transformers, etc.).

Figure 12A:
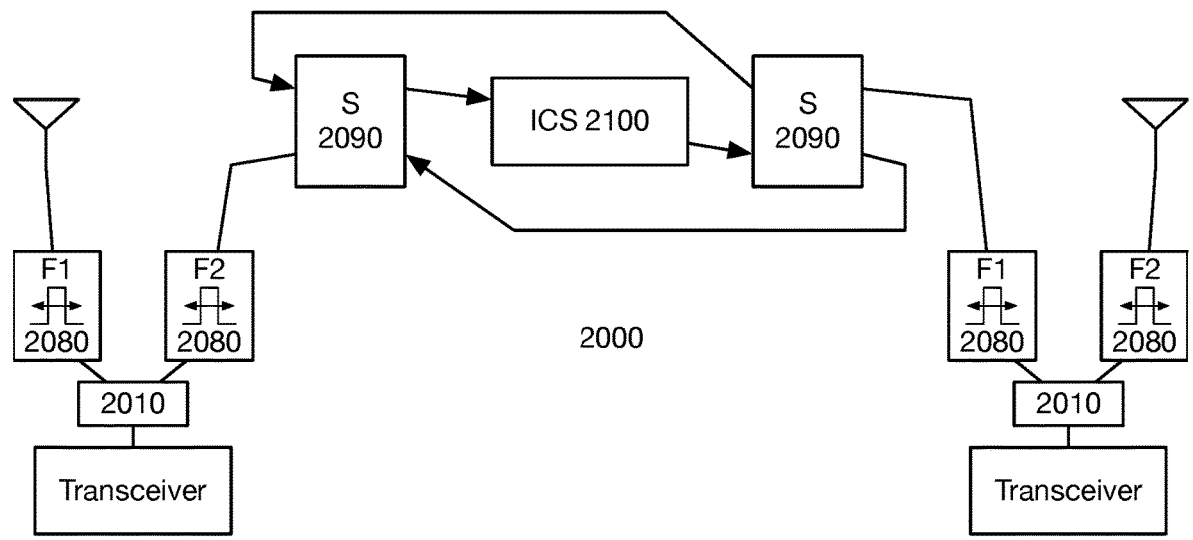
FIG. 12A is a diagram representation of an analog interference canceller of a system of an invention embodiment.

The system 2000 is preferably substantially similar to the system 1000 except that the addition of switches 2090 enable the use of interference cancellation in two directions (direction controlled and varied in time by positions of the switches 2090), as shown in FIG. 12A. Accordingly, interference and noise cancellation systems may be used for multiple bands (therefore, the ICS 2100 may perform the roles of either the TxICS 1100 or RxICS 1300, for example). Likewise, filters may correspond to multiple frequency bands (e.g., F1, F2) not inherently linked to receiving or transmitting.

In first switch positions, the first transceiver (on the left in FIG. 12A) transmits at F1 and the second transceiver (on the right) receives at F2. The F2-filtered branch of the leftmost transceiver is coupled, via the left switch 2090, to an input of the ICS 2100, which generates an interference cancellation signal that passes via the right switch 2090 to the right most transceiver, where it may then be combined with the signal received at the second transceiver to reduce noise in the F1 and F2 bands, augmenting the filters (in this case, the transmit band). In second switch positions, the first transceiver receives at F1 and the second transceiver transmits at F2; the F1-filtered branch of the rightmost transceiver is coupled, via the right switch 2090 and the left switch 2090, to the input of the ICS 2100, which generates an interference cancellation signal that passes via the switches 2090 to the left most transceiver, where it may then be combined with the signal received at the first transceiver to reduce noise in the F1 and F2 bands, augmenting the filters.

Figure 12B:
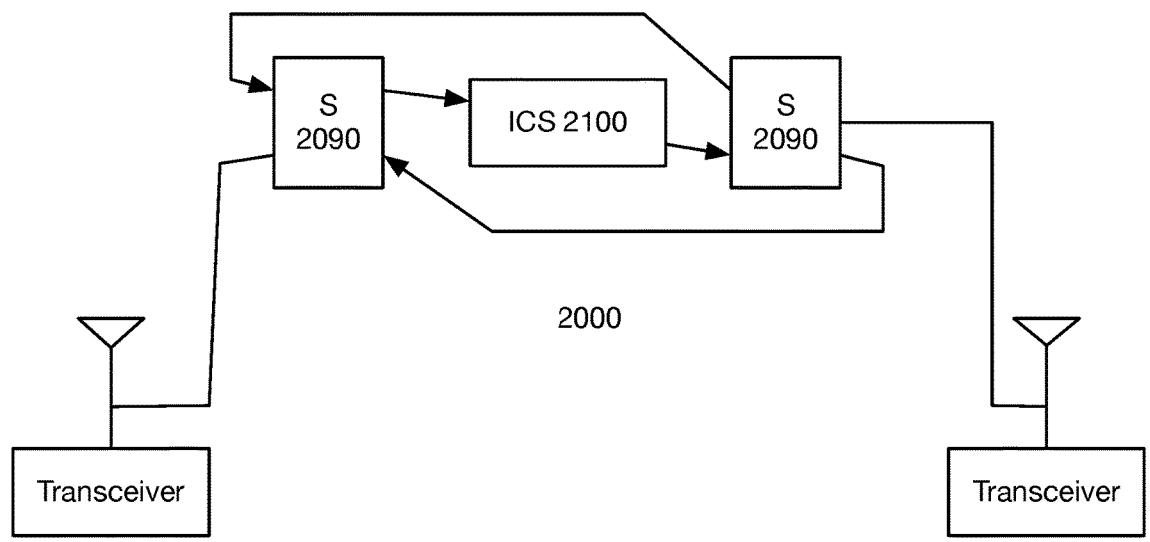
FIG. 12B is a diagram representation of an analog interference canceller of a system of an invention embodiment.

This implementation may also be used for relays or co-located transceivers that operate on the same frequencies, but use time-division multiplexing. Here, the couplers 2010 and filters 2080 may no longer be necessary, as shown in FIG. 12B.

Note that as the length and electrical properties of the paths from transceivers to the ICS 2100 differ (e.g., they are longer in one switch position than another), signal paths of the system 2000 may include gain and/or phase compensation to equalize performance across signal paths.

As a person skilled in the art will recognize from the previous detailed description and from the figures and claims, modifications and changes can be made to the preferred embodiments of the invention without departing from the scope of this invention defined in the following claims.

As a person skilled in the art will recognize from the previous detailed description and from the figures and claims, modifications and changes can be made to the preferred embodiments of the invention without departing from the scope of this invention defined in the following claims.

We claim:

1. A system for interference mitigation comprising:
a first transmit coupler, communicatively coupled to an analog transmit signal of a communication system, that splits the analog transmit signal into a first-path analog transmit signal and a second-path analog transmit signal;
a first receive-band filter that filters the first-path analog transmit signal in the receive band prior to processing by the receive-band noise cancellation system, resulting in reduced signal power outside of the receive band;
a receive-band noise cancellation system that samples the first-path analog transmit signal and generates a receive-band noise cancellation signal from the first-path analog transmit signal; wherein the receive-band noise cancellation system introduces a first noise component in the transmit band of the receive-band noise cancellation signal;
a second receive-band filter that filters the receive-band noise cancellation signal, resulting in reduced signal power outside of the receive band and in reduction of the first noise component;
a first transmit-band filter that filters the second-path analog transmit signal in a transmit band, resulting in reduced signal power outside of the transmit band;
a second transmit coupler that combines the receive-band noise cancellation signal and the second-path analog transmit signal, resulting in generation of a reduced-noise analog transmit signal; wherein the reduced-noise analog transmit signal has further reduced signal power in a receive band relative to the second-path analog transmit signal;
a first receive coupler, communicatively coupled to an analog receive signal of the communication system, that splits the analog receive signal into a first-path analog receive signal and a second-path analog receive signal;
a transmit-band noise cancellation system that samples the first-path analog receive signal and generates a transmit-band noise cancellation signal from the first-path analog receive signal;
a third receive-band filter that filters the second-path analog receive signal in the receive band, resulting in reduced signal power outside of the receive band; and
a second receive coupler that combines the transmit-band noise cancellation signal and the second-path analog receive signal, resulting in generation of a reduced-noise analog receive signal; wherein the reduced-noise analog receive signal has further reduced signal power in a transmit band relative to the second-path analog receive signal.

2. The system of claim 1, wherein the first receive-band filter delays the first-path analog transmit signal by a first amount; wherein the receive-band noise cancellation system delays the receive-band noise cancellation signal by a second amount; wherein the second receive-band filter delays the receive-band noise cancellation signal by a third amount; wherein the first transmit-band filter delays the second-path analog transmit signal by a fourth amount; wherein a sum of the first, second, and third amounts is within ten percent of the fourth amount.

3. The system of claim 2, wherein a sum of the first, second, and third amounts is within one percent of the fourth amount.

4. The system of claim 1, further comprising a time delay that delays the second-path analog transmit signal.

5. The system of claim 4, wherein the time delay delays the second-path analog transmit signal after the second-path analog transmit signal is filtered by the first transmit-band filter.

6. The system of claim 4, wherein the first receive-band filter delays the first-path analog transmit signal by a first amount; wherein the receive-band noise cancellation system delays the receive-band noise cancellation signal by a second amount; wherein the second receive-band filter delays the receive-band noise cancellation signal by a third amount; wherein the first transmit-band filter delays the second-path analog transmit signal by a fourth amount; wherein the time delay delays the second-path analog transmit signal by a fifth amount; wherein a sum of the first, second, and third amounts is within ten percent of a sum of the fourth and fifth amounts.

7. The system of claim 6, wherein a sum of the first, second, and third amounts is within one percent of a sum of the fourth and fifth amounts.

8. The system of claim 1, further comprising a second transmit-band filter that filters the second-path analog transmit signal in the transmit band after filtering by the first transmit-band filter, resulting in further reduced signal power outside of the transmit band.

9. The system of claim 8, wherein the first receive-band filter delays the first-path analog transmit signal by a first amount; wherein the receive-band noise cancellation system delays the receive-band noise cancellation signal by a second amount; wherein the second receive-band filter delays the receive-band noise cancellation signal by a third amount; wherein the first transmit-band filter delays the second-path analog transmit signal by a fourth amount; wherein the second transmit-band filter delays the second-path analog transmit signal by a fifth amount; wherein a sum of the first, second, and third amounts is within ten percent of a sum of the fourth and fifth amounts.

10. The system of claim 9, wherein a sum of the first, second, and third amounts is within one percent of a sum of the fourth and fifth amounts.

11. The system of claim 1, wherein the transmit-band noise cancellation system delays the first-path analog receive signal by a first amount; wherein the third receive-band filter delays the second-path analog receive signal by a second amount; wherein the first amount is within ten percent of the second amount.

12. The system of claim 11, wherein the first amount is within one percent of the second amount.

13. The system of claim 11, further comprising a time delay that delays the second-path analog transmit signal.

14. The system of claim 13, wherein the time delay delays the second-path analog transmit signal before the second-path analog transmit signal is filtered by the first transmit-band filter.

15. The system of claim 1, further comprising a second transmit-band filter that filters the first-path analog receive signal in the transmit band prior to processing by the transmit-band noise cancellation system, resulting in reduced signal power outside of the transmit band.

16. The system of claim 15, wherein the second transmit-band filter delays the first-path analog receive signal by a first amount; wherein the transmit-band noise cancellation system delays the transmit-band noise cancellation signal by a second amount; wherein the third receive-band filter delays the second-path analog receive signal by a third amount; wherein a sum of the first and second amounts is within ten percent of the third amount.

17. The system of claim 16, wherein a sum of the first and second amounts is within one percent of the third amount.

18. The system of claim 15, wherein the transmit-band noise cancellation system introduces a second noise component in the receive band of the transmit-band noise cancellation signal; further comprising a third transmit-band filter that filters the transmit-band noise cancellation signal, resulting in reduced signal power outside of the transmit band and in reduction of the second noise component.

19. The system of claim 18, wherein the second transmit-band filter delays the first-path analog receive signal by a first amount; wherein the transmit-band noise cancellation system delays the transmit-band noise cancellation signal by a second amount; wherein the third transmit-band filter delays the transmit-band noise cancellation signal by a third amount; wherein the first receive-band filter delays the second-path analog receive signal by a fourth amount; wherein a sum of the first, second, and third amounts is within ten percent of the fourth amount.

20. The system of claim 19, wherein a sum of the first, second, and third amounts is within one percent of the fourth amount.

* * * * *